United States Patent
Ellison et al.

(10) Patent No.: US 11,903,403 B2
(45) Date of Patent: Feb. 20, 2024

(54) LASER CUT EDIBLE DECORATING SHEET AND METHODS OF MANUFACTURE

(71) Applicant: THE LUCKS COMPANY, LLC, Anoka, MN (US)

(72) Inventors: Richard Ellison, Gig Harbor, WA (US); Ulrike M. Kogl, Maple Valley, WA (US); Megan Leifson, Tacoma, WA (US)

(73) Assignee: THE LUCKS COMPANY, LLC, Anoka, MN (US)

( * ) Notice: Subject to any disclaimer, the term of this patent is extended or adjusted under 35 U.S.C. 154(b) by 1139 days.

(21) Appl. No.: 16/678,186

(22) Filed: Nov. 8, 2019

(65) Prior Publication Data

US 2020/0138085 A1 May 7, 2020

Related U.S. Application Data

(63) Continuation of application No. 15/823,443, filed on Nov. 27, 2017, now Pat. No. 10,470,486, which is a (Continued)

(51) Int. Cl.
*A23P 10/10* (2016.01)
*A23P 30/00* (2016.01)
(Continued)

(52) U.S. Cl.
CPC ............ *A23P 10/10* (2016.08); *A23G 3/0023* (2013.01); *A23G 3/0027* (2013.01);
(Continued)

(58) Field of Classification Search
CPC .... B23K 26/38; A23G 7/0068; A23G 7/0018; A23G 4/186; A23G 3/563; A23G 3/28;
(Continued)

(56) References Cited

U.S. PATENT DOCUMENTS

| 2,813,033 A | 11/1957 | Schneider |
| 4,560,562 A | 12/1985 | Schroeder |

(Continued)

FOREIGN PATENT DOCUMENTS

| DE | 102009017837 A1 * | 10/2010 | ........... A23L 1/0073 |
| GB | 2430650 | 4/2007 | |

(Continued)

OTHER PUBLICATIONS

Examination Report issued in UK Patent Application No. GB1603971.1 dated Feb. 6, 2020.
(Continued)

*Primary Examiner* — Jimmy Chou
(74) *Attorney, Agent, or Firm* — Gardella Grace P.A.

(57) ABSTRACT

An edible decoration is laser kiss cut from an edible decorating sheet by optically sensing at least one printed edible design on the edible decorating sheet relative to a laser cutting tool coordinate system and driving a laser along a circuit of cutting locations defined in the laser cutting tool coordinate system. The laser beam forms a separation channel by laser ablation of at least a portion of the edible decorating sheet at the cutting locations while leaving intact the non-adhesive releasable backing upon which the edible decorating sheet rests.

18 Claims, 16 Drawing Sheets

Related U.S. Application Data continuation-in-part of application No. 14/504,783, filed on Oct. 2, 2014, now abandoned.

(60) Provisional application No. 61/887,327, filed on Oct. 4, 2013.

(51) Int. Cl.

| | | |
|---|---|---|
| B23K 26/38 | (2014.01) | |
| A23G 3/28 | (2006.01) | |
| A23G 7/00 | (2006.01) | |
| A23G 3/20 | (2006.01) | |
| A23G 3/34 | (2006.01) | |
| A23G 4/18 | (2006.01) | |
| A23G 3/22 | (2006.01) | |
| A23G 3/02 | (2006.01) | |
| A23G 3/56 | (2006.01) | |
| B23K 103/00 | (2006.01) | |
| A23P 20/25 | (2016.01) | |
| A21D 13/47 | (2017.01) | |

(52) U.S. Cl.
CPC ......... *A23G 3/0072* (2013.01); *A23G 3/0091* (2013.01); *A23G 3/0097* (2013.01); *A23G 3/0247* (2013.01); *A23G 3/203* (2013.01); *A23G 3/22* (2013.01); *A23G 3/28* (2013.01); *A23G 3/563* (2013.01); *A23G 4/186* (2013.01); *A23G 7/0018* (2013.01); *A23G 7/0068* (2013.01); *A23P 30/00* (2016.08); *B23K 26/38* (2013.01); *A21D 13/47* (2017.01); *A23G 2220/12* (2013.01); *A23P 2020/253* (2016.08); *B23K 2103/30* (2018.08)

(58) Field of Classification Search
CPC ........ A23G 3/22; A23G 3/203; A23G 3/0247; A23G 3/0097; A23G 3/0091; A23G 3/0072; A23G 3/0027; A23G 3/0023; A23P 30/00; A23P 10/10
USPC .......................................................... 99/537
See application file for complete search history.

(56) References Cited

U.S. PATENT DOCUMENTS

| | | | | |
|---|---|---|---|---|
| 4,839,181 | A * | 6/1989 | MacMurray | A22C 25/17 426/482 |
| 4,970,600 | A | 11/1990 | Garnier et al. | |
| 5,017,394 | A | 5/1991 | Macpherson et al. | |
| 5,051,268 | A | 9/1991 | Mally | |
| 5,436,027 | A | 7/1995 | Offer | |
| 5,614,115 | A * | 3/1997 | Horton | B26D 5/007 700/166 |
| 5,853,778 | A | 12/1998 | Mayfield | |
| 6,165,521 | A | 12/2000 | Mayfield | |
| 7,029,112 | B2 | 4/2006 | Shastry et al. | |
| 7,166,153 | B2 | 1/2007 | Russell et al. | |
| 7,597,752 | B2 | 10/2009 | Shastry et al. | |
| 8,499,718 | B2 * | 8/2013 | Chait | A01K 43/10 119/50.7 |
| 10,470,486 | B2 | 11/2019 | Ellison et al. | |
| 2001/0001516 | A1 * | 5/2001 | Hardgrove | B23K 26/351 264/102 |
| 2002/0008751 | A1 | 1/2002 | Spurgeon et al. | |
| 2004/0091588 | A1 * | 5/2004 | Li | A01J 23/00 426/248 |
| 2004/0170725 | A1 | 9/2004 | Begleiter | |
| 2006/0172046 | A1 | 8/2006 | Man | |
| 2006/0275529 | A1 * | 12/2006 | Woodhouse | A21C 9/04 426/89 |
| 2007/0231425 | A1 | 10/2007 | Ream et al. | |
| 2008/0305219 | A1 | 12/2008 | Stewart | |
| 2010/0252541 | A1 * | 10/2010 | Hogan | B23K 26/142 219/121.67 |
| 2011/0027432 | A1 | 2/2011 | Loeser | |
| 2011/0073573 | A1 * | 3/2011 | Stahl | B23K 26/38 83/52 |
| 2011/0073576 | A1 * | 3/2011 | Bucklew | B23K 26/0846 219/121.72 |
| 2011/0185868 | A1 * | 8/2011 | Schmidt | B26D 5/007 378/54 |
| 2015/0099043 | A1 | 4/2015 | Ellison et al. | |
| 2015/0366235 | A1 | 12/2015 | Torres San Juan et al. | |
| 2016/0174580 | A1 * | 6/2016 | Stenvik | A21C 15/007 426/94 |
| 2018/0132520 | A1 | 5/2018 | Ellison et al. | |

FOREIGN PATENT DOCUMENTS

| | | |
|---|---|---|
| GB | 2532402 | 5/2016 |
| WO | 1994023886 | 10/1994 |
| WO | 2013156008 | 10/2013 |
| WO | 2015051305 | 4/2015 |

OTHER PUBLICATIONS

Examination Report issued in UK Patent Application No. GB1603971.1 dated Jul. 23, 2020.
International Preliminary Report on Patentability issued in International Patent Application No. PCT/US2014/059143 dated Apr. 5, 2016.
Non-Final Office Action issued in U.S. Appl. No. 15/823,443 dated Feb. 21, 2019.
Notice of Allowance issued in U.S. Appl. No. 15/823,443 dated Jun. 19, 2019.
Non-Final Office Action issued in U.S. Appl. No. 14/504,783 dated Apr. 14, 2016.
Final Office Action issued in U.S. Appl. No. 14/504,783 dated Aug. 12, 2016.
Non-Final Office Action issued in U.S. Appl. No. 14/504,783 dated Feb. 16, 2017.
Whitworth, J., "Citrus Fruit Laser Etching Technology Offers Alternative to Labels—Developer," www.foodproductiondaily.com/Packaging/Citrus-fruit-laser-etching-technology-offer . . . , Jul. 16, 2012, visited Apr. 1, 2014, 3 pp. (previously submitted in related U.S. Appl. No. 15/823,443).
Repperpatterns.com, "Bacon Mania—Very locally Baked," http://repperpatterns.com/2010/11/bacon-mania-very-locally-baked/, Nov. 22, 2010, visited Apr. 1, 2014, 3 pp. (previously submitted in related U.S. Appl. No. 15/823,443).
Familab.org, "Global Hackerspace Coopcake Challenge 2012," http://familab.org/blog/2012/02/global-hackerspace-coopcake-challenge-2012/, Feb. 23, 2012, visited Apr. 1, 2014, 7 pp. (previously submitted in related U.S. Appl. No. 15/823,443).
Eshack, "How to Use Your Toppers" http://web.archive.org/web/20130217114549/http://cakeshop.com/info/How_to_use_, visited Apr. 21, 2014, 2 pp. (previously submitted in related U.S. Appl. No. 15/823,443).
Ebay, 12 x Precut Love Heart Valentines Day / Wedding Edible Cupcake Toppers, www.ebay.com.au, Item # 110991742908, visited Apr. 21, 2014, 3 pp. (previously submitted in related U.S. Appl. No. 15/823,443).
Signwarehouse.com, "Tape for Laser Engraving Wood Without Burn Marks," www.signwarehouse.com/blog/tape-laser-engraving-wood-without-burn-marks, Sep. 3, 2013, visited Apr. 8, 2014, 2 pp. (previously submitted in related U.S. Appl. No. 15/823,443).
Cakeshop.com. www.cakeshop.com, "How to Use Your Toppers," www.cakeshophost.co.uk/, visited Apr. 21, 2014, 2 pp. (previously submitted in related U.S. Appl. No. 15/823,443).
GCC Laser Pro, "Engraving of the Kiss-Cutting," www.gccworld.com/laserpro_en/cutt_showcase_detail.php?ID-English_070206230 . . . , visited Jul. 25, 2013, 2 pp. (previously submitted in related U.S. Appl. No. 15/823,443).
Memetics, "Decorating Cakes with an Electronic Cutter Machine," www.memetics.com/decorating-cakes-with-an-electronic-cutter-

(56) References Cited

OTHER PUBLICATIONS machine/, Jan. 9, 2013, visited Jul. 25, 2013, 4 pp. (previously submitted in related U.S. Appl. No. 15/823,443).
Icingimages.com, "Electronic Cutting Systems," http://icingimages.com/silhouette-cameo-cuter, visited Jul. 25, 2013, 2 pp. (previously submitted in related U.S. Appl. No. 15/823,443).
Potatopress.com, "Laser Cut Cake Icing?", http://potatopress.com.au/blog/laser-cut-cake-icing/, visited Jul. 25, 2013, 4 pp. (previously submitted in related U.S. Appl. No. 15/823,443).
Foodbeast.com, "Laser-Cut Sushi Rolls Are Magical, Could Change the Sushi Industry?", http://foodbeast.com/content/2012/04/18/laser-cut-sushi-rolls-are-magic-could-change-th . . . , Apr. 18, 2012, visited Jul. 25, 2013, 7 pp. (previously submitted in related U.S. Appl. No. 15/823,443).
Trotec Laser, "SpeedMarker CL Marking Laser," www.troteclaser.com/en-US/Laser-Machines/Industrial/Pages/SpeedMarkerCL.aspx, visited Apr. 2, 2014, 3 pp. (previously submitted in related U.S. Appl. No. 15/823,443).
Trotec Laser, "Marking on the Fly", www.troteclaser.com/en-US/Laser-Machines//Accessories/Options/Pages/Marking-on - . . . , visited Apr. 2, 2014, 1 p. (previously submitted in related U.S. Appl. No. 15/823,443).
Youtube.com, "Laser Engraving on a Chocolate Bar", www.youtube.com/watch?v=axTPnqaZu58, Feb. 3, 2011, visited Apr. 1, 2014, 2 pp. (previously submitted in related U.S. Appl. No. 15/823,443).
Youtube.com, "Christmas Cookies Marked with a 200 Watts CO2 Laser", www.youtube.com/watch?v=psUBVry2q00, Dec. 17, 2008, visited Apr. 1, 2014, 2 pp. (previously submitted in related U.S. Appl. No. 15/823,443).
Youtube.com, "Cutting Gingerbread with Laser", www.youtube.com/watch?v=7Y5OYezuRUM, Dec. 24, 2008, visited Apr. 1, 2014, 2 pp. (previously submitted in related U.S. Appl. No. 15/823,443).
Youtube.com, "Laser Engraving Food—Peanut Butter Cup", www.youtube.com/watch?v=KtVc0ZSuuUw, Jan. 31, 2011, visitied Apr. 11, 2014, 2 pp. (previously submitted in related U.S. Appl. No. 15/823,443).
Youtube.com, "KNK Zing Icing Print and Cut.wmv", www.youtube.com/watch?v=nWPG5eBJZkQ, Oct. 11, 2011, visited Oct. 7, 2014, 2 pp. (previously submitted in related U.S. Appl. No. 15/823,443).
Sawmill Creek, "Please Help, Laser Novice!", www.sawmillcreek.org/showthread.php?193545-Please-help-laser-notice!, Oct. 29, 2012, visited Apr. 21, 2014, 2 pp. (previously submitted in related U.S. Appl. No. 15/823,443).
Sawmill Creek, "Calling All Experts . . . Which Cutting Method Should I Use?", www.sawmillcreek.org/showthread.php?209685-Calling-all-experts-Which-cutting - . . . , Nov. 2, 2013, visited Apr. 21, 2014, 10 pp. (previously submitted in related U.S. Appl. No. 15/823,443).
Designboom.com, "Lasercut Nori for Designer Sushi", www.designboom/design/lasercut-nori-for-designer-sushi/, Apr. 26, 2012, visited Jul. 25, 2013, 4 pp. (previously submitted in related U.S. Appl. No. 15/823,443).
Lasersharp Work Station Series, LaserSharp WorkStation, publicly available as of Oct. 2, 2014, 2 pp. (previously submitted in related U.S. Appl. No. 15/823,443).
International Searching Authority/United States Patent and Trademark Office, International Search Report and Written Opinion, PCT/US14/59143, dated Dec. 24, 2014, 14 pp. (previously submitted in related U.S. Appl. No. 15/823,443).

* cited by examiner

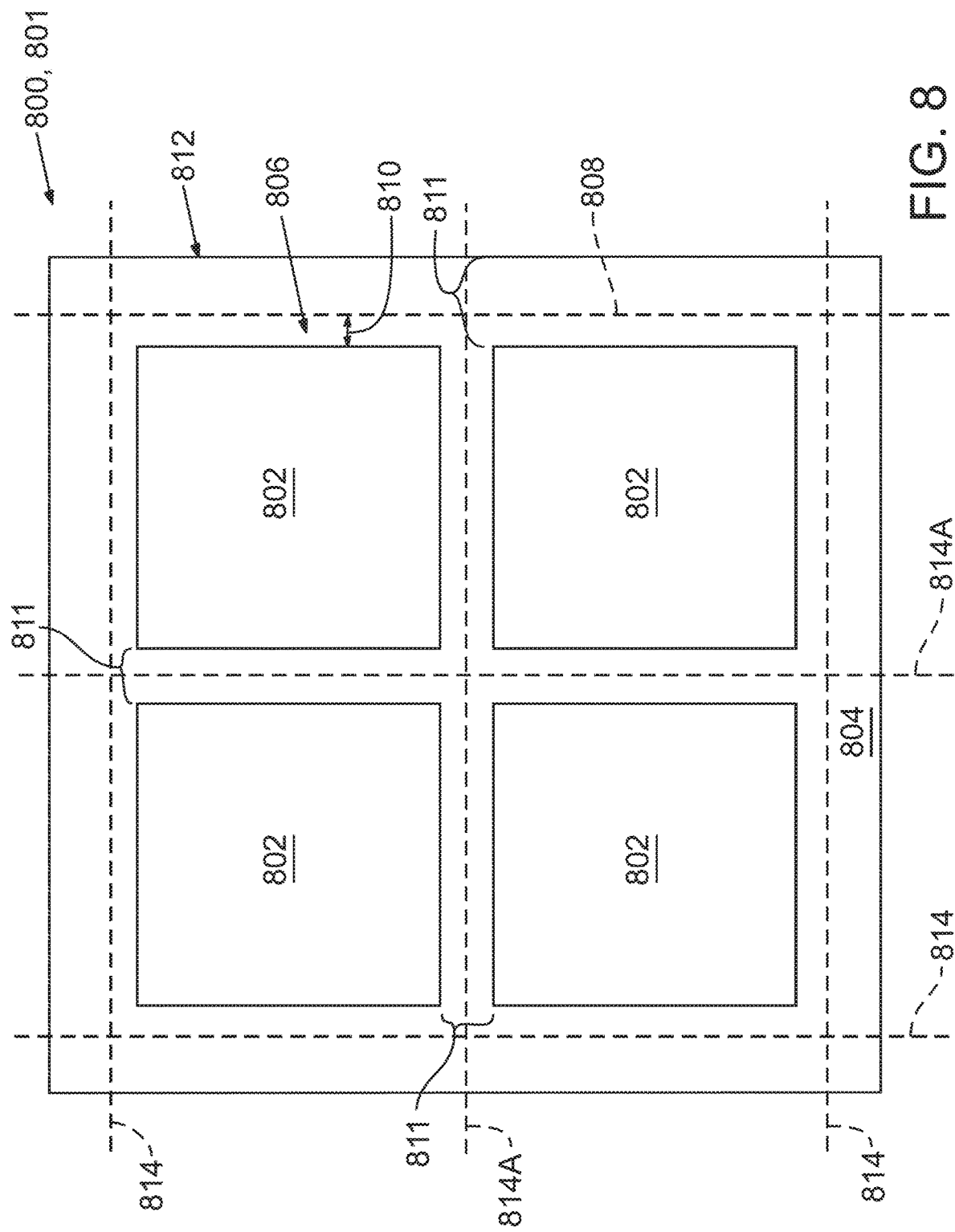

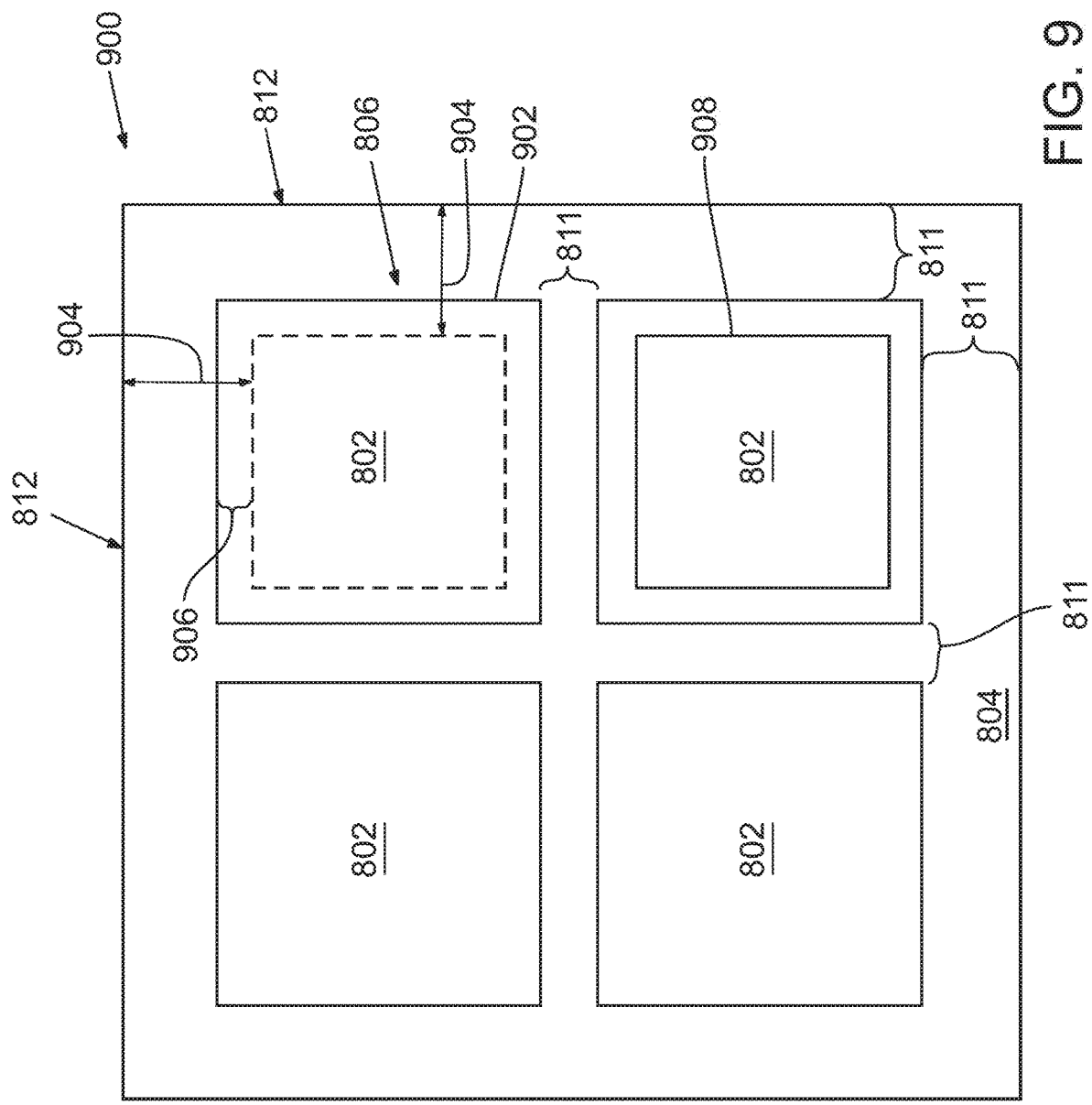

LASER CUT EDIBLE DECORATING SHEET AND METHODS OF MANUFACTURE

RELATED APPLICATIONS DATA

This application is a continuation of U.S. patent application Ser. No. 15/823,443, filed on Nov. 27, 2017, which is a continuation-in-part of and claims the benefit under 35 U.S.C. § 120 from U.S. patent application Ser. No. 14/504,783 (now abandoned), filed Oct. 2, 2014, which is a non-provisional of and claims priority under 35 U.S.C. § 119(e) to U.S. Provisional Application No. 61/887,327, filed on Oct. 4, 2013, the disclosures of which are hereby incorporated by reference in their entireties.

TECHNICAL FIELD

The field of the present disclosure relates generally to systems and methods for laser cutting edible decorating sheets to create edible decorations for cakes, cookies, and other confections.

BACKGROUND

Cakes and other confections that delight the eyes can tantalize, building an expectation of certain delectability in the bites that follow. To that end, pastry artisans labor to transform humble treats into showpieces that are decorated to draw the eye and the appetite. For example, some artisans use edible pastry appliqués to ornament cakes. Pastry artisans labor for long periods of time to create appealing appliqués and position them on cakes to tempt the appetite. Achieving a uniform appearance with these appliqués can be difficult, even for those having artistic skill. Appliqués that contain piercings or are otherwise processed to form fine structural members may exhibit unsightly jagged, torn, or fragmented edges introduced by mechanical cutting tools. Tattered-looking appliqués may degrade the presentation and appeal of the cake, potentially transforming a moment of mouthwatering expectation into one of regret.

BRIEF DESCRIPTION OF THE DRAWINGS

FIG. 8 is a top schematic view of an embodiment of a pattern for cutting a master sheet;

FIG. 9 is a top schematic view of another embodiment of a pattern for cutting a master sheet;

DETAILED DESCRIPTION OF PREFERRED EMBODIMENTS

Figure 1A:
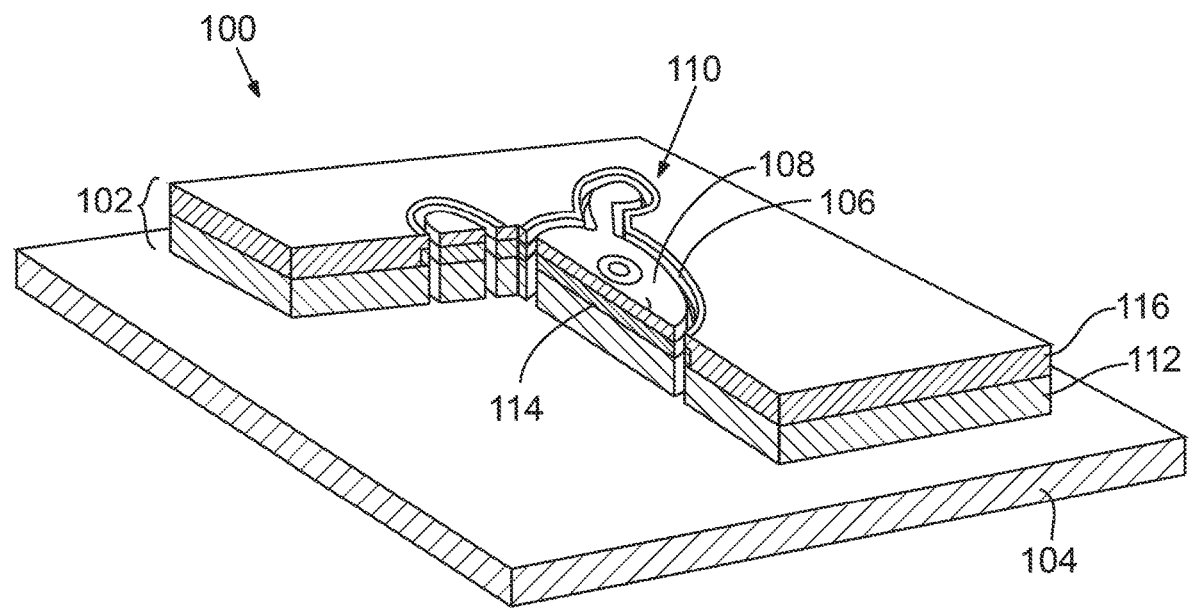
FIG. 1A is a perspective cutaway view of an embodiment of an edible decorating sheet containing an example printed edible design.
Figure 1B:
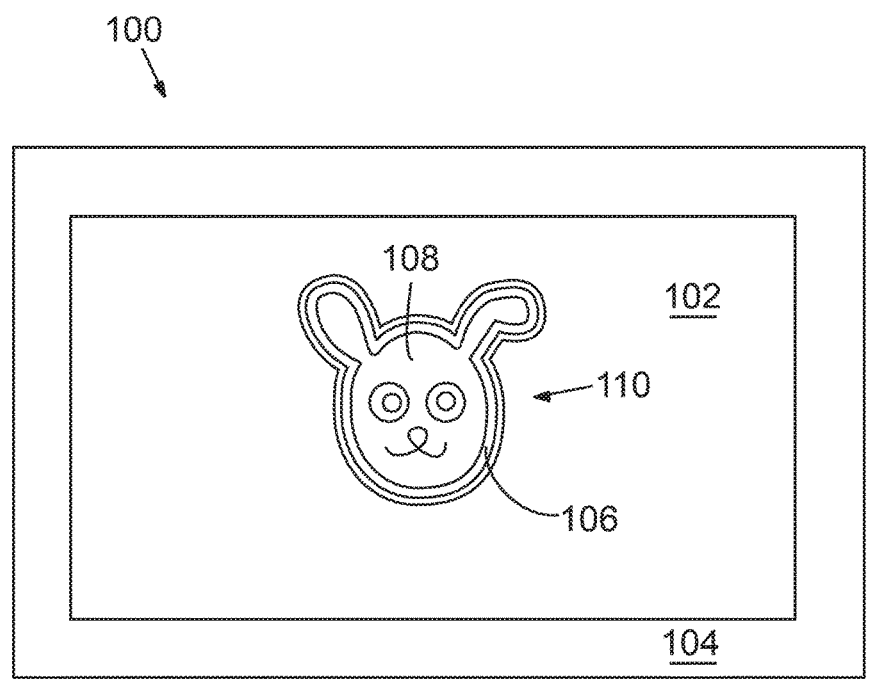
FIG. 1B is a top schematic view of the embodiment shown in FIG. 1A.

FIGS. 1A and 1B show a cutaway perspective view and a top view, respectively, of an embodiment of a freestanding sheet of confection decoration stock 100. Confection decoration stock 100 includes an edible decorating sheet 102 supported or carried by a releasable backing 104. The edible decorating sheet 102 includes a pre-printed edible design 110 (illustrated as a bunny in the figures) that may be screen printed with edible inks or otherwise formed on the edible decorating sheet 102. The edible design 110 is separated from the edible decorating sheet 102 via a laser ablation or etching process. As is further explained in detail below, the laser follows a preset circuit or patch around the edible design 110 to remove portions of the edible decorating sheet 102 and form a separation channel 106 entirely through the edible decorating sheet 102. The depth of the laser cut is precisely controlled to ensure that the releasable backing 104 remains substantially intact (that is, without significantly degrading the structural integrity of the releasable backing 104). Cutting separation channel 106 around edible decoration 108 without cutting releasable backing 104 "kiss cuts" edible decoration 108 from edible decorating sheet 102. When the edible design 110 is ready to be removed, the design 110 is peeled away from the releasable backing 104 like a sticker and applied to a cake, cookie, or other edible product. In other embodiments, the laser may be used to etch an edible design or decoration into the edible decorating sheet 102 without going entirely through the edible decorating sheet 102 and reaching the releasable backing 104. Additional details of the etching process are described below.

Cutting edible decoration 108 from edible decorating sheet 102 without structurally compromising releasable backing 104 may provide several advantages. For example, after kiss cutting edible decoration 108, both the releasable backing 104 and the edible decoration negative (see FIGS. 3C and 3D at 302) may protect corners and edges of edible decoration 108 from handling, shipping, storage, or other damage prior to use. In addition, several edible decorations 108 supported by common releasable backing 104 can be removed individually, as needed, while those decorations retained on the backing remain protected until future use. Further, differently-shaped edible decorations 108 may be cut from a common edible decorating sheet and readily packaged for sale in an attractive sheet format, perhaps unified by theme (e.g., Halloween, Valentine's Day, or other occasions) or in kit form, where a user assembles a complex two- or three-dimensional edible decoration from the differently-shaped elements. Individually cut out decorations do not lend themselves to this style of packaging and marketing because the backing sheet is cut together with the decorating sheet. Kits and seasonally-themed sets require extensive tooling for potentially limited-run products, possibly delaying their entry to the market.

However, in other embodiments, the laser may be used to cut through both the edible decorating sheet 102 and the releasable backing 104 to create the same design in both and allow greater nesting or stacking capabilities for packaging purposes. For example, in some embodiments, both the edible decorating sheet 102 and the releasable backing 104 may be laser cut in one or multiple passes. Because of the differences in the properties of the materials (e.g., the high sugar content of the edible decorating sheet 102 and waxiness of the releasable backing 104), it may be necessary to adjust the power and/or cutting speed of the laser when cutting through the materials. For example, using too high of a power may caramelize the edible decorating sheet 102, but using too low of a power may not cut through the releasable backing 104. Accordingly, adjusting the power and/or cutting speed when transitioning from the edible decorating sheet 102 to the releasable backing 104 may facilitate cutting through both materials effectively.

Figure 12:
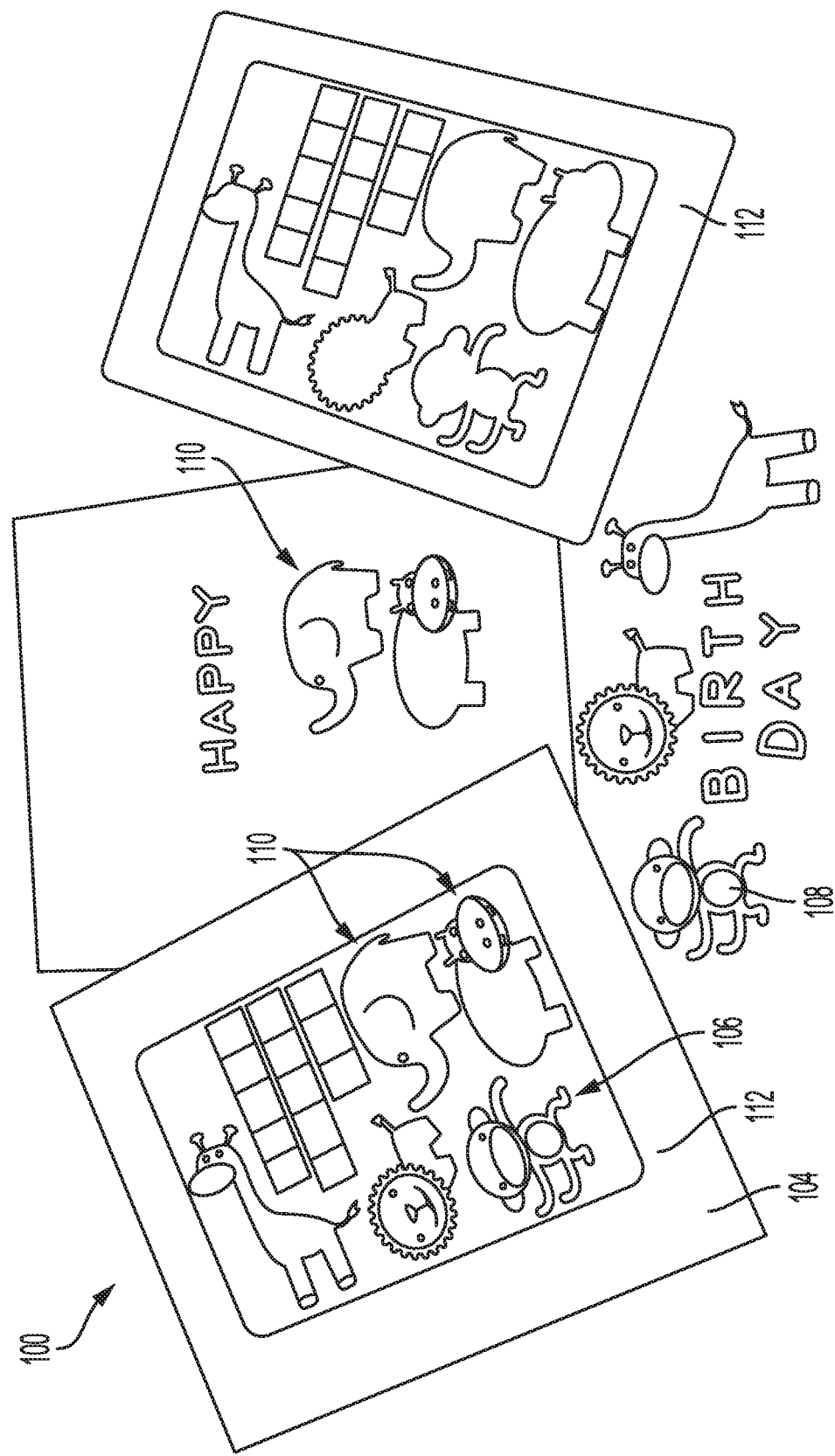
FIG. 12 is a photograph showing embodiments of confection decoration sheets.

FIG. 12 is a photograph showing an example embodiment of confection decoration sheet 100 including a releasable backing 104 and an edible decorating sheet 112 from which various edible decorations 108 have been kiss cut so that a printed edible design 110 extends all the way to the edge of separation channel 106 and preferably slightly beyond. Preferably, the separation channel 106 is offset from the border of the each pre-printed edible design 110 so that a fraction of the pre-printed designs remain on the decorating sheet 112 when each edible decoration 108 is removed, as illustrated in FIG. 12. Forming the separation channel 106 away from the border of the pre-printed design 110 helps ensure that when the edible decoration 108 is removed from the backing 104, the edges are crisp and incorporate all the colors and design features of the edible design 110.

Figure 11:
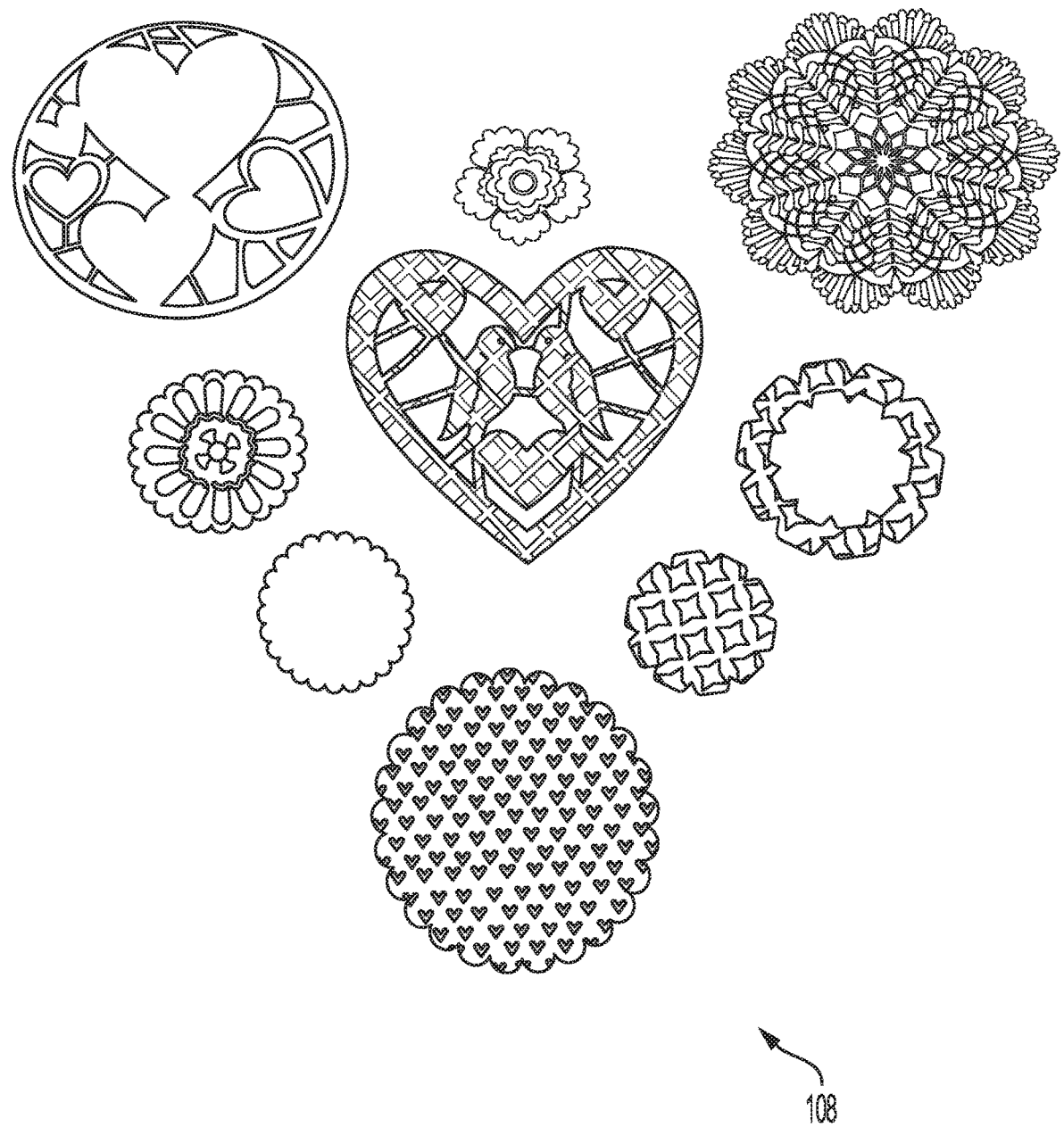
FIG. 11 is a photograph showing embodiments of edible decorations.

It should be understood that although an edible decoration 108 is illustrated as an animal shape, a wide range of figures, diagrams, designs, and characters can be cut from an edible decorating sheet using the embodiments described herein. Any number of fun and exciting decorations, from simple shapes and letters having minimal ornamentation to complex and intricate lacework pre-printed with detailed graphical designs, are expected to be readily achieved as described in detail below. For example, FIG. 11 is a photograph showing various embodiments of edible decorations 108, some having pre-printed designs while others are not pre-printed. The following discussion includes additional details relating to various components of the confection decoration stock 100 and methods for kiss cutting edible designs therefrom.

FIG. 1A is a perspective cutaway view illustrating various layers of edible material of the edible decorating sheet 102 according to one embodiment. Preferably, edible decorating sheet 102 is formulated from ingredients approved for human consumption (e.g., under the Food, Drug, and Cosmetic Act (FD&C) administered by the U.S. Food and Drug Administration (FDA), or under relevant laws, codes, and/or regulations established by other food safety regulatory authorities, such as the European Food Safety Authority). Edible inks used in formulating and applying the various print layers described below are formulated using food safe (e.g., FD&C) dyes, lakes, and commercial food colorings which may be water soluble or oil-dispersed. In such embodiments, edible decorating sheet 102 and edible decoration 108 are generally safe for human consumption.

In the embodiment shown in FIG. 1A, edible decorating sheet 102 includes three primary layers. For clarity, the thicknesses of the layers are exaggerated, and are not shown to any particular scale or sized relative to one another. The decorating sheet 102 includes an edible base layer 112 that provides mechanical integrity and food stability for edible decorating sheet 102. The base layer 112 rests on releasable backing 104 during the laser ablation process, but is designed to be removed from the releasable backing 104. To facilitate this process, releasable backing 104 may include a suitable paper substrate coated with a food safe silicone layer that will contact edible decorating sheet 102. One non-limiting example of a releasable backing 104 is a silicone-coated paper sold under the trade name Poly E39/S manufactured by the Tribex Corporation of Rocklin, California. In some embodiments, the releasable backing 104 is made of a non-adhesive material to facilitate removal of the edible decorating sheet 102 after laser-cutting without damaging the substrate. Some non-limiting examples of non-adhesive materials may include wax coated paper, silicone coated paper, and other suitable releasable liners.

In some embodiments, edible base layer 112 may include an edible dye or colorant that alters the color of edible layer 112. For example, titanium dioxide ($TiO_2$) may be blended or included in edible layer 112 to impart a white appearance to the layer. In some embodiments, edible layer 112 may act as a color contrast layer for a subsequently applied edible design 110.

In some embodiments, edible base layer 112 may have a laminated structure including two or more sublayers that provide one or more of these features, while in some other embodiments, edible base layer 112 may be a single homogeneous layer. Accordingly, edible base layer 112 may vary in thickness. For example, edible base layer 112 may range in thickness of between about 110 micrometers (μm) and 1500 μm. More preferably, some example laminated base layers may have a thickness in a range of between about 110 μm and 350 μm, while some example homogenous base layers may have a thickness in a range of about 1000 μm to 1500 μm. Some embodiments of edible decorating sheet 102 include an edible base layer 112 alone. One non-limiting example of an edible decorating sheet supported by a releasable backing is sold under the trademark PRINTONS® by the Lucks Food Decorating Company of Tacoma, Washington Other non-limiting examples include gum pastes, fondants, icing sheets, and wafer papers.

As described previously, edible decorating sheet 102 includes an edible design 110 printed onto edible base layer 112. In the embodiment shown in FIG. 1A, printed edible design 110 is shown on top of base layer 112, applied via an edible print region 114. In some embodiments, edible print region 114 may span edible decorating sheet 102, creating a field (e.g., of one or more colors, images, or designs), while in some other embodiments, edible print region 114 may occupy one or more portions of edible decorating sheet 102. That is, edible print region 114 may include as one or more printed borders, pictorial images, diagrams, and/or designs including one or more colors arranged on edible decorating sheet 102. If included, printed edible design 110 may be applied via "print-on-demand," for example by on-the-fly ink jet printing of a design, or via a print run of pre-selected designs.

Edible print region 114 may include one or more layers of edible ink that form a diagram or pictorial image on a top surface of base layer 112. For example, cyan, magenta, yellow, and black edible inks may be included in a four-color, CMYK process. In some embodiments, the base layer 112 may be dyed or otherwise colored to serve as background coloration for the edible print region 114. In some embodiments, one or more edible ink colors may be applied separately as individual edible ink subregions (e.g., via screen printing) or concurrently in a variegated edible ink subregion (e.g., by ink jet printing). Non-limiting examples of edible decorating sheets bearing pre-printed edible designs are sold under the trademark EDIBLE IMAGE® by the Lucks Food Decorating Company of Tacoma, Washington.

In some embodiments, edible print region 114 may be covered or overlaid with an edible moisture barrier cap layer 116. Edible cap layer 116 preserves and protects the top surface of the printed edible design 110, such as from moisture and/or other debris generated during laser ablation and/or other post-printing processing and packaging steps. Preferably, moisture barrier cap layer 116 is substantially transparent so that the printed edible design 110 is visible through a top surface of moisture barrier cap layer 116. In the embodiment shown in FIGS. 1A and 1B, printed edible design 110 is visible through a top surface of moisture barrier cap layer 116. In some embodiments, the edible moisture barrier cap layer 116 may be substantially flush against the top surface of base layer 112 and over the edible print region 114, where the edible moisture barrier cap layer 116 overlays all or substantially all of the top surface of base layer 112. Preferably, the entire edible moisture barrier cap layer 116 overlays only the top surface of the base layer 112, with the side surfaces and the bottom surface of the base layer 112 remaining free of the edible moisture barrier cap layer 116, such that the bottom surface of the base layer 112 contacts the releasable backing 104. In some embodiments, the edible moisture barrier cap layer 116 may extend and cover some or all of the side surfaces of the base layer 112. In such embodiments, the edible moisture barrier cap layer 116 is seated flush against the side surfaces of the base layer 112. Preferably, the entirety of the edible moisture barrier cap layer 116 is seated flush against the top surface of the base layer 112 and/or the side surface of the base layer 112.

In some embodiments, edible decorating sheet 102, including the various layers and regions that may be contained therein, may be formed by screen casting or printing, spraying, ennobling, or dipping a comestible fluid onto releasable backing 104 or by other means to form a wet edible decorating blank. For example, a method of screen casting edible base material on release paper is described in detail in U.S. Pat. No. 5,017,394 (Macpherson, et al.). In some embodiments, a dried edible decorating "blank," or an non-edge trimmed layer or laminate of base layer(s), print region(s) (a blank may include markings and printing), and a cap layer, may be edge trimmed or cut to form an trimmed edible decorating sheet. In some embodiments, a wet edible decorating blank may be directly dried to form an untrimmed edible decorating sheet.

Figure 16:
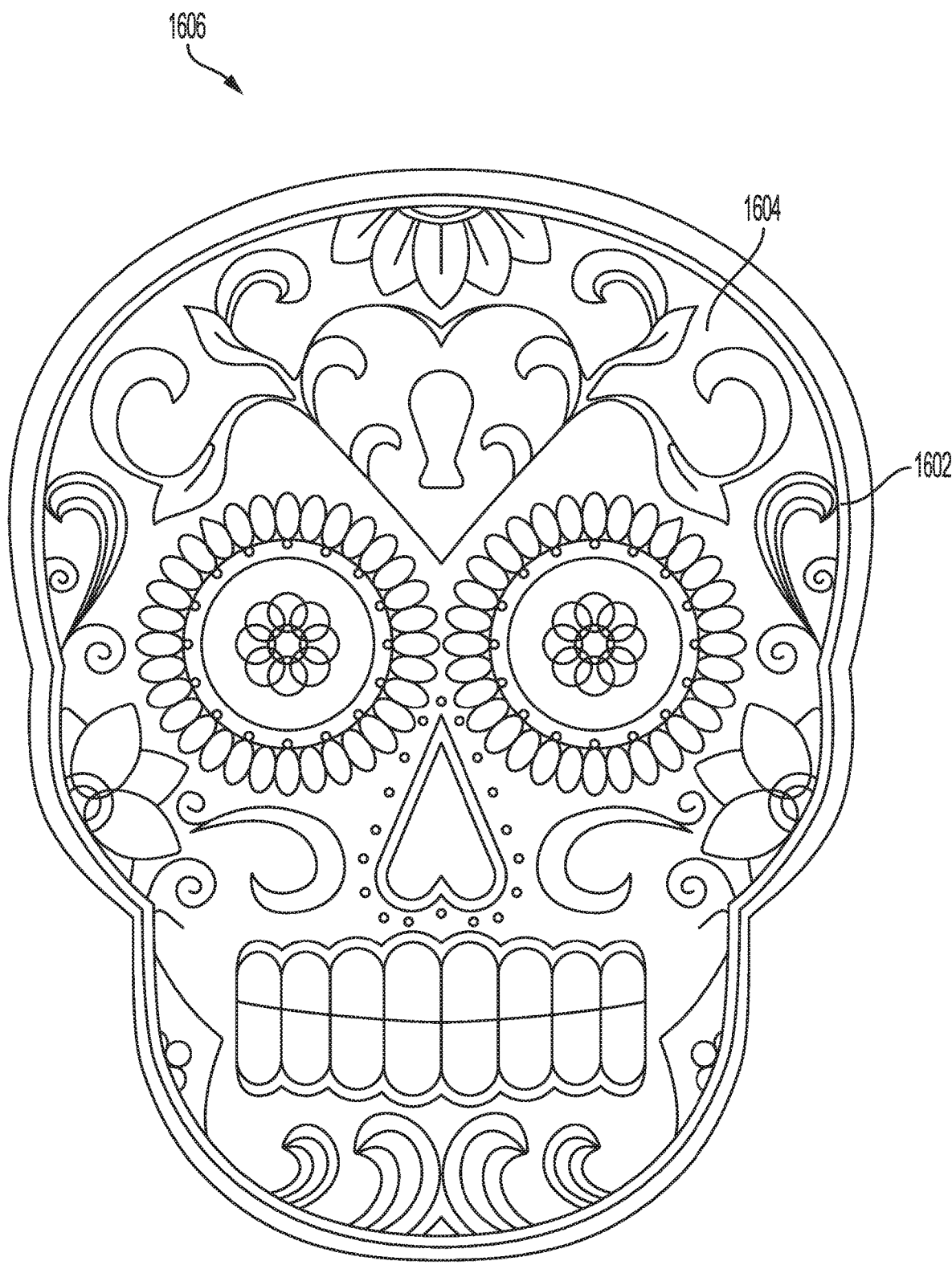
FIG. 16 is a photograph showing an embodiment of a laser ablated edible decoration.

In other embodiments, the edible decorating sheet 102 may be a single layer (or multiple layers) of edible material that may be partly laser ablated or etched to create an edible relief design (i.e., a design that does not require ablating through the entirety of the decorating sheet). For example, with reference to FIG. 16, the decorating sheet 1602 may be a single, uniform layer of fondant with a color layer 1604 (shown black in FIG. 16) screen printed or otherwise applied over the layer of fondant 1602. In other embodiments, the edible decorating sheet 1602 may include one or more layers of gum pastes, icing sheets, and wafer papers. Once the color layer 1604 has dried over the fondant 1602, a laser ablation process (as described further in detail below) may be used to remove portions of the color layer 1604, and portions of the fondant layer 1602 (but not the full thickness of the fondant layer), to create an etched or edible relief design 1606. In some embodiments, the decorating sheet 1602 (i.e., the fondant layer) may be dyed or otherwise colored to serve as a color backdrop for the relief design 1606. In other embodiments, the color layer 1604 may incorporate multiple colors or color layers to create a multi-colored edible relief design 1606, as desired.

In some embodiments, the layer of fondant 1602 may be supported on a removable backing sheet (such as backing sheet 104), where the edible design 1606 may be peeled away or removed when ready to apply to a confection. In other embodiments, the backing sheet may be omitted and the edible relief design 1606 may be a standalone product comprising the layer of fondant 1602 and the color layer 1604.

Once a finished edible decorating sheet 102 (including any optional edible print regions 114 and any optional trimming and cutting) is formed on confection decoration stock 100, edible decoration 108 may be kiss cut therefrom. The embodiments disclosed herein generally relate to kiss cutting edible decorations from edible decorating sheets via laser ablation. The following section describes additional details relating to methods of kiss cutting edible decorations.

Figure 2:
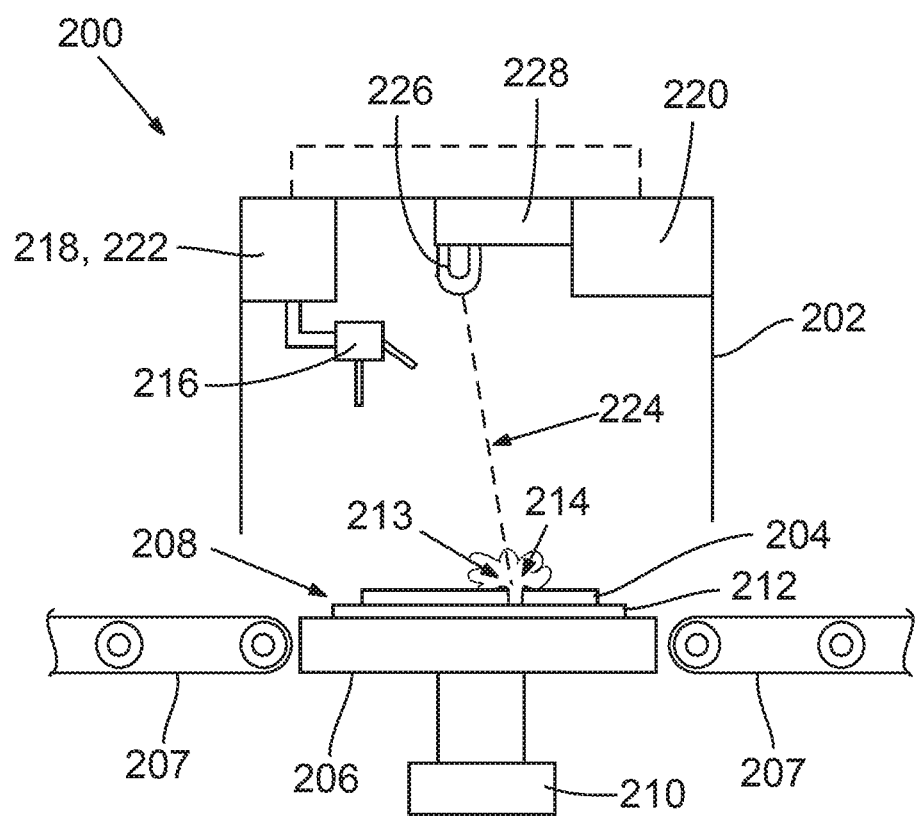
FIG. 2 is a schematic cross-sectional view of one embodiment of a laser cutting tool.

FIG. 2 is a cross-sectional view of an embodiment of a sheet-fed laser cutting tool 200. Laser cutting tool 200 includes a cutting chamber 202 within which edible decorations may be cut from edible decorating sheet 204. In the embodiment shown in FIG. 2, a platen 206 within cutting chamber 202 is fed freestanding sheets of confection decoration stock 208 by a transfer system 207. Platen 206 supports confection decoration stock 208 during laser cutting, and in some embodiments may be moved within cutting chamber 202 (e.g., in two or three directions) via a kinematic drive 210. In some embodiments, platen 206 may also include a vacuum or a mechanical chuck to hold confection decoration stock 208 in position once placed thereon.

Because there may be small variations in the placement of a sheet of confection decoration stock 208 on platen 206 and/or the placement of edible decorating sheet 204 on releasable backing 212, laser cutting tool 200 and edible decorating sheet 204 are aligned with one another after edible decorating sheet 204 is placed in a cutting position within cutting chamber 202. Put another way, alignment permits registration between the spatial positions on edible decorating sheet 204 and the internal coordinates and reference positions used by laser cutting tool 200. Once aligned, a cutting design architecturally defined in digital design software can be translated into the physical and spatial design for the circuit of cutting locations (see FIGS. 3A and 3B at 304) on the edible decorating sheet where the separation channel will be cut. That is, alignment permits a digitally-rendered cutting design (which may be stored in a memory associated with the laser cutting tool 200), including a cutting path that defines edible decoration boundaries, to be instantiated as separation channel 214 (see also FIGS. 3B, 3C, and 3D at 306) on the exposed surface of edible decorating sheet 204 as described in more detail below. Non-limiting examples of digital design software include computer-aided design software like one sold under the trade name AUTOCAD by Autodesk, Inc. of San Rafael, California, and vector graphics editors like one sold under the trade name ADOBE ILLUSTRATOR by Adobe Systems Incorporated of San Jose, California.

In some embodiments, alignment may be established after the sheet is placed on platen 206. Generally, laser cutting tool 200 senses several datums or reference points (see FIG. 3A at 308) contained on edible decorating sheet 204 prior to making a cut. In the embodiment shown in FIG. 2, a sensor 216 obtains spatial position data for at least a portion of edible decorating sheet 204 including one or more datums 308. In some embodiments, sensor 216 may be an optical sensor. In one example process, the optical sensor 216 senses one or more edges, corners, or portions of a pre-printed edible design (or the entire design); one or more edges or corners of the edible decorating sheet 204 or releasable backing 212; or one or more other optically detectable features, such as a registration mark, an image, or a watermark included in the releasable backing 212. Data collected by the optical sensor 216 may be used to determine spatial positions for some of the features, marks, graphics, images, or watermarks contained therein. For example, one or more datums 308 included in a printed edible design may be defined in software. An optical shape recognition of the printed edible design may be used to obtain the spatial positions for the datums 308.

Once the spatial position data for the datums 308 has been obtained, the spatial positions are transformed into corresponding positions within a laser cutting tool coordinate system. In the embodiment shown in FIG. 2, laser cutting tool controller 218, which is in electrical communication with laser source 220 and sensor 216, includes laser cutting tool coordinate system 222. In one example according to this embodiment, spatial positions for datums 308 on portions of a printed edible design obtained from images collected by sensor 216 are transformed into corresponding positions within laser cutting tool coordinate system 222. Laser cutting tool 200 becomes aligned with edible decorating sheet 204 via this coordinate transformation.

It should be understood that in other embodiments, the laser cutting tool 200 may be aligned with the edible decorating sheet 204 using other suitable methods. For example, in one embodiment, the laser cutting tool 200 may include various design patterns stored in a memory storage medium, or accessible via a portable memory device, such as a USB flash drive, a CD, or other suitable device. The memory may include information pertaining to various elements of the designs on the edible decorating sheet 204, such as the placement, arrangement, and dimensional measurement (or other spatial positioning data) of the pre-printed designs on the edible decorating sheet 204. For example, in one embodiment, each decorating sheet 204 may include four edible designs (such as edible design 108) spaced apart into four quadrants of the edible decorating sheet 204. In other embodiments, each decorating sheet 204 may include any other number of edible designs arranged in any suitable manner. In such embodiments, after sensing an edge or corner of the edible decorating sheet 204, the laser cutting tool 200 may obtain the design pattern information from the memory unit to determine the number and arrangement of designs on the decorating sheet 204 to be processed. Once that information is obtained, the laser cutting tool 200 may obtain positioning data for each of the edible designs in preparation for the laser ablation process.

Once the edible decorating sheet 204 and the laser cutting tool 200 are aligned with one another, the laser ablation process may be performed. With reference to FIG. 2, laser beam 224 generated by laser source 220 intersects a portion of a top surface of edible decorating sheet 204. Laser beam 224 vaporizes at least some of the exposed surface of edible decorating sheet 204, which includes the edible base layer onto which the design is printed and the edible moisture barrier cap layer overlaying the base layer, as described with reference to the edible decorating sheet 102 of FIG. 1. During the ablation process, the laser beam 224 first removes a portion of the edible moisture barrier cap layer, as that is the exterior layer of the edible decorating sheet 204. Once the laser beam 224 has evaporated enough of the edible moisture barrier layer, the laser beam 224 thereafter encounters the edible base layer. The laser ablation process is continued until a separation channel is formed between the edible design and the remainder of the edible decorating sheet 204 (as described in further detail with reference to FIGS. 3A, 3B, and 3C). In one non-limiting example, laser light is generated by a non-contact (i.e., the source makes no contact with the cutting surface), sealed carbon dioxide ($CO_2$) diffusion cooled laser, capable of an output laser power in a range of between about 10 Watt (W) and 300 W at a wavelength of approximately 10.6 μm and capable of steered laser beam cutting speeds of up to about 5,000 millimeters per second (mm/s) with an accuracy of about +/−125 μm and stationary laser beam cutting speeds of up to about 850 mm/s with an accuracy of about +/−25 μm. In this example, the laser beam width may be approximately 400 μm, translating into a separation channel having approximately the same width at the bottom of the channel. One non-limiting example of a laser cutting tool is sold under the trade name LASERSHARP WORKSTATION WS300 by LasX Industries, Inc., of St. Paul, Minnesota Preferably, the characteristics of the laser, such as its power, cutting speed, etc., are selected to allow the laser ablation process to vaporize the edible decorating sheet 204 and form the separation channel without caramelizing the sugar or otherwise leaving burn marks in the edible decorating sheet 204 or other layer of the edible decoration.

FIGS. 3A, 3B, 3C, and 3D collectively illustrate the edible decorating sheet 204 at various stages of the laser ablation process. With particular reference to these figures, the following section describes an example laser ablation process as applied to kiss cutting an edible design 310. While FIGS. 3A-3D depict a single printed edible design 310 for clarity, it will be appreciated that any number of printed edible designs 310 may be present on edible decorating sheet 314.

Figure 3A:
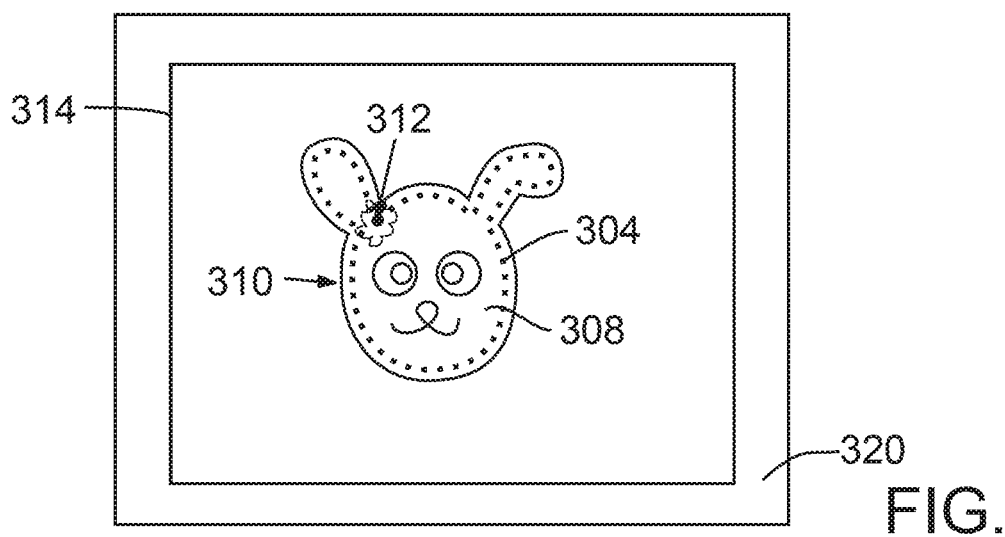
FIG. 3A is a schematic top plan view of an embodiment of a cutting chamber showing an initial cut by a laser beam.

In FIG. 3A, laser beam 312 is shown making an initial cut into the edible base layer and the edible moisture barrier of the edible decorating sheet 314 inside an outer edge or boundary of a pre-printed edible design 310. As described previously, positioning the cuts inside the boundary of the pre-printed design 310 helps ensure that the edges of the edible design 310 are clean and incorporate all the colors and design features of the edible design 310. During laser ablation, laser beam 312 travels along a pre-set path or circuit 304 of cutting locations to form a separation channel 306 (see FIG. 3B). Put another way, a laser beam spot moves relative to an exposed surface of edible decorating sheet 314, supplying power to the spot location for a given time to remove at least a portion of the sheet material traversed by the spot. It should be understood that the circuit 304 may not be physically marked on the surface of the edible decorating sheet 314, but is included in the figures to illustrate a path along which laser beam 312 may travel to kiss cut the printed edible design 310 from the edible decorating sheet 314, as translated from the cutting path referenced by laser cutting tool coordinate system 222 (see FIG. 2).

Figure 3B:
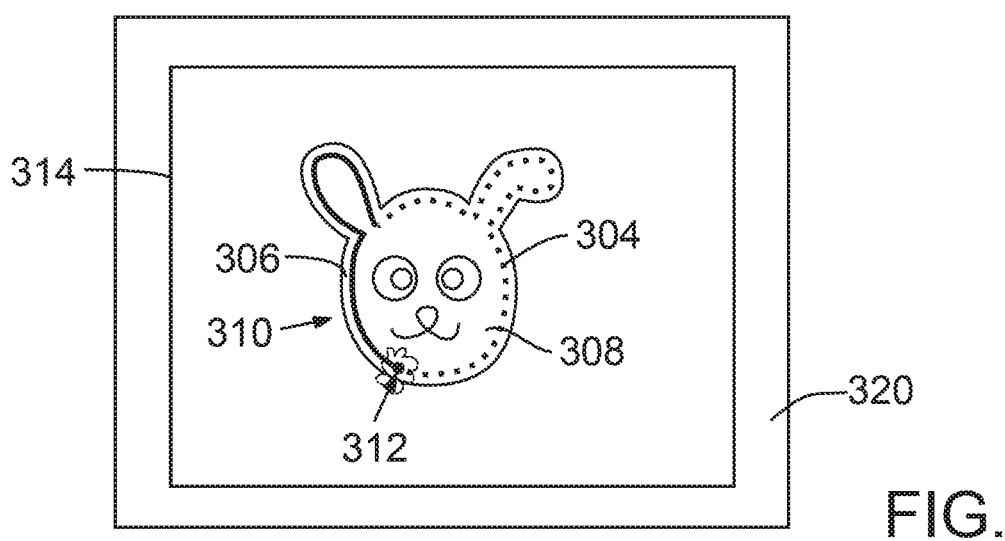
FIG. 3B is the view shown in FIG. 3A as the laser beam travels along a circuit of cutting locations to form a separation channel.

FIG. 3B shows the embodiment of FIG. 3A after laser beam 312 has cut partway along the path of circuit 304. At this point, the edible decoration 308 has not yet been kiss cut from edible decorating sheet 314, as laser beam 312 has not yet cut along the entire distance of circuit 304. That is, separation channel 306 is not yet substantially closed end-to-end, excluding channel discontinuities (e.g., perforations) reasonably sized to permit easy removal of the edible decoration. The laser beam 312 continues cutting through the edible decorating sheet 314 until the circuit 304 has been completed and the separation channel 306 is fully formed as shown in FIG. 3C.

Figure 3C:
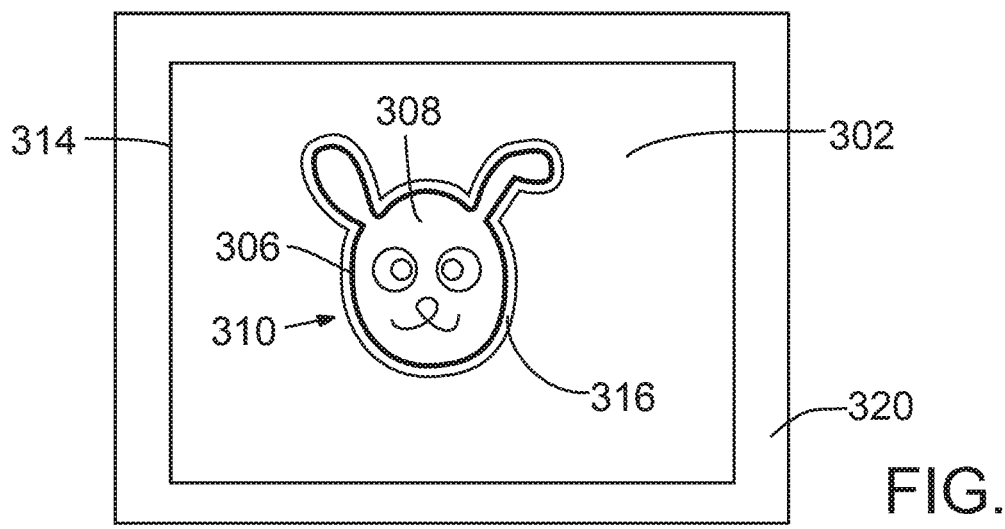
FIG. 3C is the view shown in FIG. 3B after the laser beam has finished forming a separation channel around the edible decoration.

In the embodiments shown in FIGS. 3B and 3C, a border region 316 of printed edible design 310 remains on edible decorating sheet 314 after forming separation channel 306. Leaving a small ribbon of printed edible design 310 outside of separation channel 306 allows a printed surface of the edible decoration to extend to a cut edge 318 (see FIG. 3D) formed during laser ablation. This may permit nearly seamless joining of several edible decorations on a confection, potentially enhancing the visual appeal of the finished dessert.

In some embodiments, a laser beam may be steered or deflected along a stationary exposed surface of the edible decorating sheet. In the embodiment shown in FIG. 2, a scan head 226, in optical communication with laser source 220 via an optical path 228, steers laser beam 224 across edible decorating sheet 204 to form separation channel 214. For example, laser beam 224 may be steered at speeds of up to about 900-1600 mm/s, or preferably between about 1200-1600 mm/s, for some edible decorating sheets having thicknesses in a range of between about 110 μm and 350 μm. As another example, laser beam 224 may be steered at speeds of between about 750-1100 mm/s for some edible decorating sheets having thicknesses in a range of between about 1000 μm to 1500 μm.

In some other embodiments, platen 206 may translate edible decorating sheet 204 relative to a stationary laser beam 224. In still other embodiments, both laser beam 224 and platen 206 may move in concert to cause laser beam 224 to traverse circuit 304 of cutting locations (see FIGS. 3A and 3B).

In some embodiments, a laser beam may provide sufficient laser energy to edible decorating sheet 204 (that is, the laser energy flux of the laser beam at the exposed surface of edible decorating sheet 204) to form a separation channel extending downwardly throughout the entire thickness of edible decorating sheet 204 without ablating or vaporizing substantial amounts of non-adhesive releasable backing 212. For example, in some embodiments, the depth of the laser ablation process may be precisely measured so that the laser beam cuts entirely through the layers of the edible decorating sheet 204, but ceases the ablation process upon reaching the non-adhesive releasable backing 212 so that the backing 212 remains intact throughout the ablation process.

It will be appreciated that the laser energy flux may vary according to the formulation and physical properties of the edible decorating sheet 204 being cut. Sugar and fat content, and layer thickness and density, among other properties, may affect the rate of vaporization and the susceptibility of the separation channel sidewalls to charring and/or caramelizing. Accordingly, one or more of the intensity and power of laser source 220, and the cutting speed of laser beam 224 (e.g., as steered by scan head 226) may be varied to generate a laser spot 213 on edible decorating sheet 204 with sufficient energy to form separation channel 214 while having insufficient energy to burn or caramelize the edible decorating sheet 204 and/or to cause substantial amounts of re-deposition of releasable backing 212 upon the sidewalls of separation channel 214 or on a top surface of edible decorating sheet 204. For example, while some miniscule amount (e.g., less than 100 parts per million (ppm) of platinum, as measured by X-ray fluorescence, originating from a silicone coating formed from a platinum-catalyzed reaction of vinyl-containing dimethylpolysiloxane) of a food safe silicone coating on releasable backing 212 may be vaporized and subsequently re-deposited upon edible decorating sheet 212, it would be expected that the structural integrity of releasable backing 212 is unaffected by laser ablation. Thus, while releasable backing 212 may be ablated, burned, or damaged in some small amount, laser beam 224 does not sever or cut through releasable backing 224 (and in some embodiments, is not visually marked by laser beam 224) during kiss cutting and does not substantially degrade the mechanical and structural integrity of the releasable backing.

Likewise, in some embodiments, laser beam 224 may have sufficient intensity, cutting speed, and power to form separation channel 214 without caramelizing or charring the laser cut edges of the edible decoration (i.e., the sidewalls of separation channel 214) as readily detected by visual inspection of the same with the naked eye.

Figure 4:
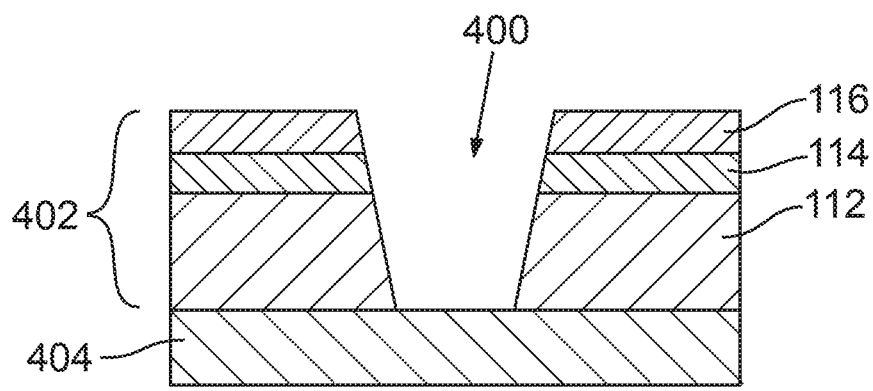
FIG. 4 is a schematic cross-sectional view of an embodiment of a separation channel extending downwardly throughout a laminated edible decorating sheet.

FIG. 4 schematically illustrates a cross-sectional view of an embodiment of a separation channel 400 extending downwardly throughout a laminated edible decorating sheet 402 and stopping on releasable backing 404. In other embodiments, the laser beam may remove most, but not all, of the edible material when forming a separation channel. For example, a laser beam may leave a thin layer (e.g., less than 20% of the thickness of edible decorating sheet 402) at the bottom of the channel, or may perforate part or all of the circuit path length of the channel. Such features may help protect edible decorations during packaging and shipping.

In some embodiments, a single pass of a laser beam along a circuit of cutting locations may be sufficient to kiss cut an edible decoration from an edible decorating sheet. Put another way, one pass of a laser beam may remove all or a majority of the thickness of an edible decorating sheet when creating a separation channel, while leaving intact the portion of the releasable backing beneath the separation channel. However, in other embodiments, a laser beam may make multiple passes along the same circuit of cutting locations, repeatedly ablating material from the same locations on of the edible decorating sheet at a laser beam energy flux, power, intensity, or cutting speed insufficient to ablate the entire initial thickness of the edible decorating sheet. That is, the laser beam may make several passes along the same separation channel, removing a portion of the overall thickness of the edible decorating sheet during each lap of the circuit until the separation channel extends downwardly throughout the entire thickness of the edible decorating sheet as shown in FIG. 4.

Recursive laser ablation may help manage heat and mass transfer within a separation channel. For example, thick layers (e.g., 1000 µm or greater) of edible decorating sheet may be more susceptible to heat and gas accumulation within the ablated channel. In such instances, a single pass with sufficient laser intensity, power, or cutting speed to cut through the entire thickness may cause undesirable charring on the sidewalls of the channel and/or ignition of gases evolved during laser ablation. However, repeatedly passing a laser beam of lower intensity, power, or cutting speed, relative to that needed to cut a full thickness, may permit gases and heat to dissipate before the next pass and avoid charring or otherwise damaging the edible design.

In some embodiments, one or more laser beam parameters may change during ablation (e.g., dynamic adjustments to power, cutting speed, and/or intensity made during cutting without stopping). Such changes may be made programmatically, automatically, or manually, and in some embodiments may be performed in between laps or passes so that the separation channel is controlled to an approximately uniform depth along its course.

Figure 5A:
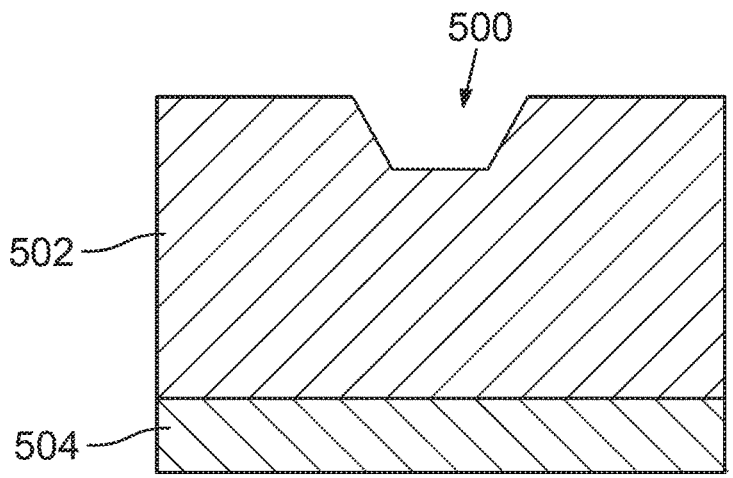
FIG. 5A is a schematic cross-sectional view of another embodiment of a separation channel extending downwardly through a first portion of an edible decorating sheet.
Figure 5B:
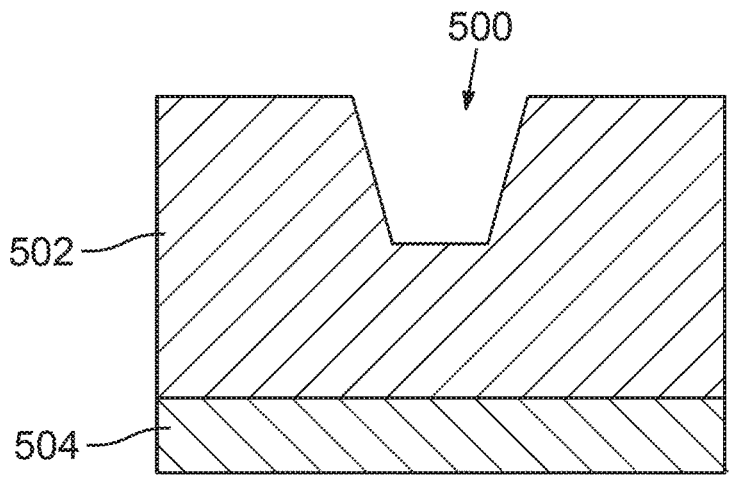
FIG. 5B is the view of FIG. 5A showing the separation channel extending downwardly through a second portion of the edible decorating sheet.
Figure 5C:
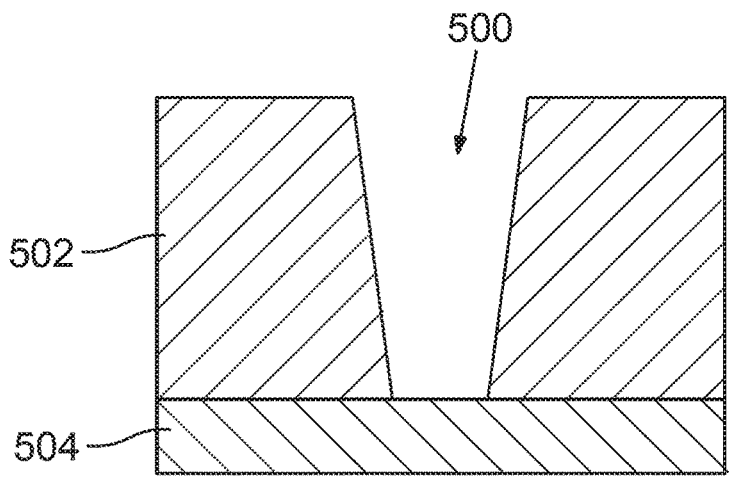
FIG. 5C is the view of FIG. 5B showing the separation channel extending downwardly throughout the edible decorating sheet.

FIGS. 5A-5C schematically show cross-sectional views of a separation channel 500 extending downwardly, in successive amounts, through an edible decorating sheet 502 by a laser beam operated at a constant power (e.g., 300 W) while the cutting speed is adjusted after each pass through the circuit of cutting locations. In the embodiment shown in FIG. 5A, a first pass by a laser beam traveling at a first cutting speed (e.g., at a fast cutting speed—for example 1100 mm/s) initially forms separation channel 500 with only a portion of the decorating sheet 502 removed. In the embodiment shown in FIG. 5B, a second pass by the laser beam, now traveling at a second cutting speed (e.g., at an intermediate cutting speed—for example, 925 mm/s), deepens separation channel 500. Finally, the embodiment shown in FIG. 5C shows that a third pass by the laser beam at a third cutting speed (e.g., at a slow cutting speed—for example, 750 mm/s), completes the channel, extending it downward to releasable backing 504.

Accordingly, varying the cutting speed per pass at a constant beam power effectively varies the flux of laser energy at the exposed surface of the edible decorating sheet. Of course, other approaches for varying the flux of laser energy at the exposed surface may also be employed. In some embodiments, laser power may be varied between passes. In some other embodiments, an otherwise continuous laser beam may be pulsed, reducing the intensity of the laser beam over time and potentially forming separation channel 500 using microperforations. Put another way, a laser beam may be operated at any suitable power, intensity, and/or cutting speed to ablate, in one or more passes, most or all of the edible material from a separation channel while leaving the releasable backing uncut and substantially intact. It will be appreciated that individual edible decorations freed from the same edible decorating sheet may be kiss cut using different laser parameters. This may permit laser processing of a multi-region edible decorating sheet that contains several regions of differing or graduated thickness, density, and/or formulation, among other properties, which might ordinarily be unsuited to knife or die cutting.

Regardless of whether the separation channel reaches the releasable backing in one pass or several, once the channel is cleared of all or substantially all of the edible material contained therein along the path length of the separation channel, the laser beam may be directed to cut other edible decorations from other portions of the edible decorating sheet, to cut edible decorations from a different edible decorating sheet, or to cut the releasable backing, and optionally print on the kiss cut edible decorations thereafter.

Figure 10:
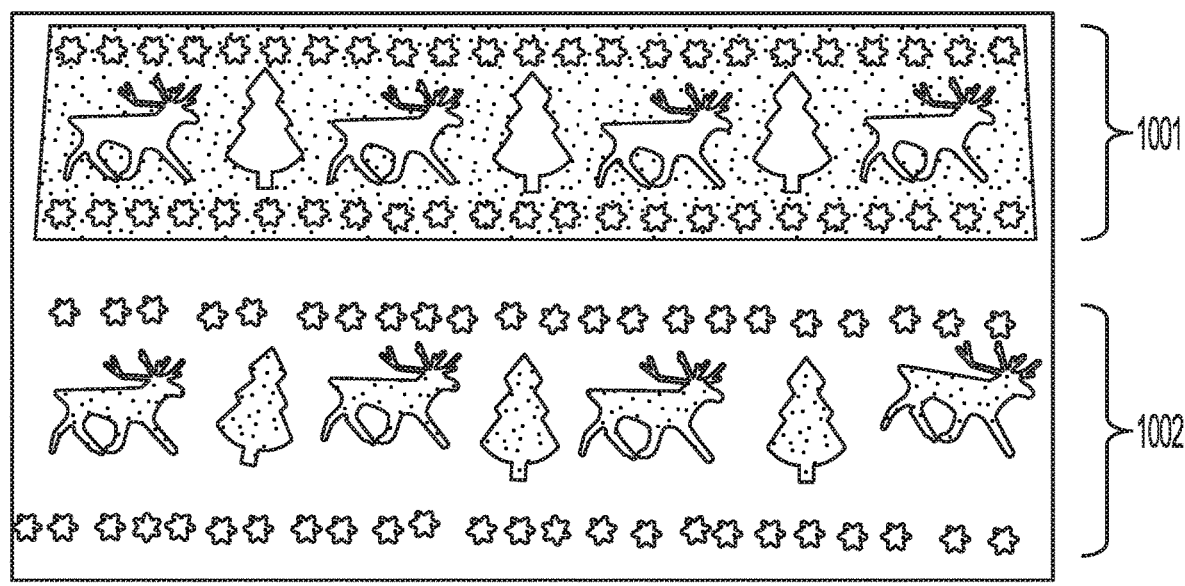
FIG. 10 is a photograph showing an embodiment of a set of an edible decoration negative and edible decorations.

After the laser cutting process concludes, the residual edible decorating sheet surrounding the edible decorations is considered an edible decoration negative. As an example, FIG. 3C shows the embodiment of FIG. 3B after laser beam 312 has cut along the entire distance of circuit 304 and separation channel 306 is closed end-to-end. That is, FIG. 3C shows an example kiss cut edible decoration 318 surrounded by edible decoration negative 302 (see also FIG. 3D). In some embodiments, it may be desirable to leave edible decoration negative 302 intact. Having approximately the same height as edible decoration 318, edible decoration negative 302 may help protect delicate edge features (e.g., points, curlicues, etc.) of edible decoration 318 during packaging and shipping. Further, leaving edible decoration negative 302 intact may assist with printing in some embodiments where a printing step follows kiss cutting edible decoration 318. For example, a pre-printed and kiss cut edible decoration 318 may be intended for additional custom printing by a user. In such applications, edible decoration negative 302 may ease handling and registration of confection decoration stock 100 at a user's inkjet printer using edible inks. Further still, in some embodiments, edible decoration negative may be used as an edible decoration. FIG. 10 shows an embodiment of an edible decoration negative 1001 and a plurality of edible decorations 1002.

Figure 3D:
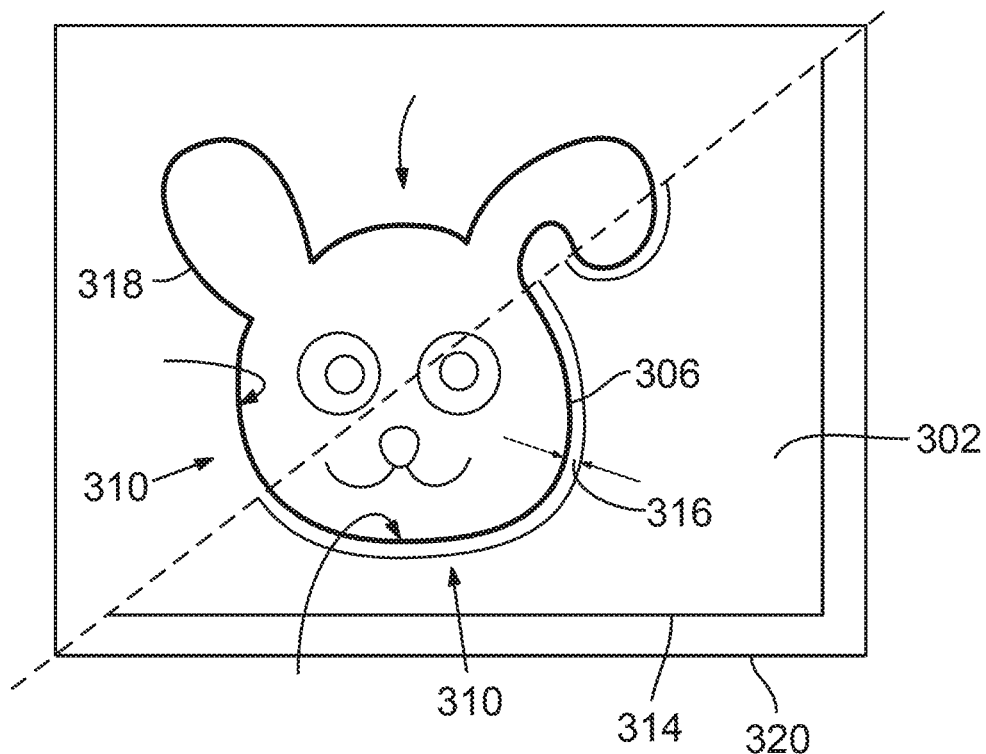
FIG. 3D is the view shown in FIG. 3C, showing removal of the edible sheet waste from a portion of the releasable backing.

In other embodiments, the edible decoration negative 302 may be waste material (e.g., edible sheet waste). It may be desirable to remove edible decoration negative from releasable backing 320 while leaving edible decoration 318 in place. Edible decoration negative 302 may be removed by, among other methods, vacuum pick-and-place or peeling from releasable backing 320. FIG. 3D shows the embodiment of FIG. 3C after removing edible decoration negative 302 from one-half of releasable backing 320 along the separation channel 306. Removing part or all of edible decoration negative 302 from releasable backing 320 may ease removal of edible decoration 318 from releasable backing 320 at a later time.

As mentioned previously with reference to FIG. 16, in some embodiments, the edible decorating sheet 102 may be etched or partially laser ablated so as to create an edible relief design. In such embodiments, the ablation process may be similar to the process described above with reference to FIGS. 5A-5C, with the laser beam cutting through only a portion of the decorating sheet to create an etched design as in FIG. 16. The laser beam may employ a single pass or multiple passes as described above. In some embodiments, the laser power and cutting speed may be adjusted to achieve a desired cutting depth into the edible decorating sheet without caramelizing or otherwise damaging the edible decorating sheet.

While the embodiments above relate generally to edible decorations 318 kiss cut from freestanding sheets of confection decoration stock 100, in some embodiments, edible decorations 318 may be kiss cut from a web of confection decoration stock using a laser beam.

Figure 6:
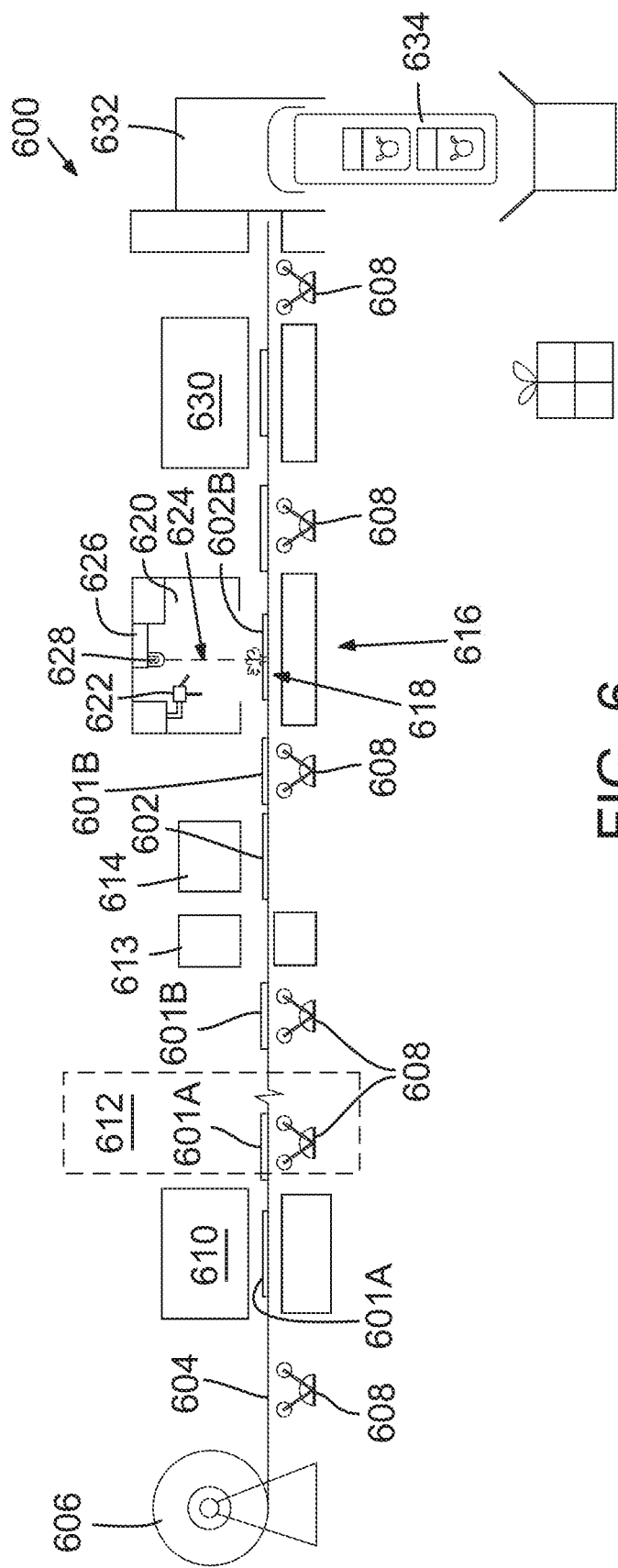
FIG. 6 is a schematic view of another embodiment of a laser cutting tool.

FIG. 6 is a schematic view of an embodiment of a manufacturing system 600 configured to print and kiss cut edible decorations from edible decorating sheets 602 supported on a releasable backing web 604. In the embodiment shown in FIG. 6, a roll 606 of releasable backing web 604 is supplied by a web transport system 608 to a decorating sheet deposition module 610. In some embodiments, decorating sheet deposition module 610 may include one or more screen casting stations that form individualized, spaced-apart uniform or multi-region wet edible decorating blanks (shown at 601A) by depositing one or more base layers on releasable backing web 604 using a screen casting operation similar to the one taught by U.S. Pat. No. 5,017,394 (Macpherson, et al.).

After exiting decorating sheet deposition station 610, the releasable backing and the spaced-apart wet edible decorating blanks are transported via web transport system 608 into a drying module 612. In some embodiments, drying module 612 may include one or more temperature and/or humidity controlled evaporation stations staged to gently dry the wet edible decorating blanks into spaced-apart dried edible decorating blanks 601B. In the embodiment shown in FIG. 6, dried edible decorating blanks 601B are kiss cut in an optional laser cutting station 613 to form edible decorating sheets 602. In some other embodiments, edible decorating sheets 602 may be formed directly by in drying module 612.

Edible decorating sheets 602 supported by releasable backing web 604 may then be stored (e.g., in rolls) for future processing, or carried by web transport system 608 into an optional print module 614, which may apply printed edible designs via "print-on-demand," (e.g., by on-the-fly inkjet printing of a design), or via a print run of pre-selected designs. Optional print module 614 may include one or more printing stations used to apply one or more printed edible designs to some or all of the edible decorating sheets 602 passing therethrough. Each printing station may apply an ink layer including one or more colors of an edible ink. For example, five screen printing stations arranged in a series may apply, in four ink layers, a four-color image process using four edible ink colors (e.g., CMYK) and, in a fifth ink layer, a custom edible ink color. In another example, five ink jet print heads spaced apart along web transport system 608 within print module 614 may apply five colors to five spaced-apart edible decorating sheets 602 nearly concurrently.

The embodiment shown in FIG. 6 also includes a laser cutting tool 616. A selected edible decorating sheet 602B is aligned with laser cutting tool 616 upon entering a cutting position 618 within cutting chamber 620. In some embodiments, laser cutting tool 616 optically senses several datums contained on selected edible decorating sheet 602B. Data collected by an optical sensor 622 may be used to determine spatial positions for the datums. In turn, the spatial position data for the datums may be transformed into corresponding positions with a laser cutting tool coordinate system used by laser cutting tool 616 to direct a laser beam 624 from a laser source 626 via a scan head 628. Once aligned with selected edible decorating sheet 602B, laser cutting tool 616 begins kiss cutting the edible decoration from selected edible decorating sheet 602B.

Laser beam 624 is steered or guided by scan head 628 along a circuit of cutting locations defined by the laser cutting tool coordinate system to form, by laser ablation of a selected edible decorating sheet 602B, a separation channel therein. In some embodiments, two or more laser beams may be included, each laser beam 624 being steered or guided by a scan head 628 in optical communication with the respective laser source 626, potentially speeding cutting and permitting faster web travel. Regardless of the number of laser beams 624 employed, web transport system 608 continuously moves edible decorating sheets 602 through laser cutting tool 616 while separation channels are being formed therein by laser ablation. Once the separation channel is substantially closed from end to end and a majority of the initial thickness of the selected edible decorating sheet 602B is removed by laser ablation, scan head 628 directs its laser beam 624 to another circuit of cutting locations and begins kiss cutting another edible decoration.

Laser beam 624 may perform the kiss cutting in a single pass of the circuit or in two or more passes of the same circuit. Put another way, laser beam 624 may be operated at any suitable power, intensity, and/or cutting speed to ablate, in one or more passes, most or all of the edible material from the separation channel while leaving releasable backing web 604 beneath the separation channel intact.

In some embodiments, laser cutting tool 616 may also trim or cut edible decorating sheets 602, creating one or more preference edges or datum features used a subsequent printing module (not shown). For example, print module 614 may be positioned after laser cutting tool 616, or a second print module may positioned after laser cutting tool 616, in some embodiments. In such embodiments, a cut reference edge of edible decorating sheet 602 may be used to align print screens or ink jet heads so that a subsequently applied printed edible design is printed on to the kiss cut edible decorations.

After kiss cutting the edible decorations from the edible decorating sheets, web transport system 608 transfers releasable backing web 604 to an optional sheet waste removal module 630. If employed, sheet waste removal module 630 removes, via pick-and-place or peeling, the edible sheet waste from releasable backing web 604. Once the edible sheet waste is removed, the edible decorations stand alone on releasable backing web 604. Web transport system 608 transfers releasable backing web 604 to packaging module 632, where the releasable backing supporting at least one edible decorating sheet 602 is slit or otherwise cut free from the rest of the web. The freestanding sheets of releasable backing carrying the edible decorations are then packaged. In the embodiment shown in FIG. 6, one or more individualized sheets are packed together in an attractive wrapper 634 that showcases the edible decorations contained inside.

In some embodiments, each of the releasable backing sheets in the non-adhesive releasable backing web 604 may be laser scored prior to feeding the web 604 to the decorating sheet deposition module 610. The scoring traction marks on the releasable backing sheets, which may be coated with a non-stick, non-adhesive coating to facilitate removal of the edible decoration, helps improve traction of the sheets as they are moved through the various printing modules of the manufacturing system 600. Any one of a variety of suitable traction marks may be scored onto the backing sheets, depending on the dimensions and characteristics of the equipment used in the manufacturing system 600. Without traction marks, the non-adhesive/release properties of the backing sheets may create traction issues for the printing mechanism. For example, it may be difficult to accurately grab a single sheet of releasable backing material and feed it into the system without slippage. In some cases, the slippage may lead to a sheet being rejected from the process, may create jamming issues, or may lead to a misprint due to improper feed angle/orientation of the sheet.

In addition to the traction marks, the backing sheets may further include laser scored directional inputs to proper loading into a printer to ensure proper alignment of the edible decoration. In some embodiments, Media Access Codes (MACs) may also be scored onto the backing sheets to allow the user to access and unlock a virtual inventory of available designs. In other embodiments, other markings may be added to the scoring sheets, such as UPC codes for order and product identification, and other QR codes or web address links for access to instruction and product information.

In some embodiments, a master sheet including several spaced apart edible decorating blanks, or in some embodiments, edible decorating sheets, may be laser cut, either to separate individual sheets from the master sheet or to edge trim, by kiss cutting, an edible decorating blank into an edge-trimmed edible decorating sheet. Regardless of what kind of cut a laser beam is making, laser cutting may offer an approach to improving cut tolerance relative to mechanically-made cuts. Whereas a mechanical cutter may have a cutting tolerance of about 1/16th of an inch (about 0.063 in. or about 1.59 mm), a laser cutter similar to the laser cutter described herein may have a cutting tolerance of approximately 250 µm (about 0.009 in.), or preferably about 125 µm (about 0.005 in.), more preferably about 25 µm (about 0.001 in.). Consequently, registration errors in subsequent printing or cutting steps are less likely to occur and be visually apparent to the naked eye.

FIG. 8 is a schematic top view of an embodiment of cutting pattern 800 for cutting a reference edge in a master sheet 801 including a plurality of mutually spaced apart edible decorating blanks 802 arranged in an array on a releasable backing 804. In the embodiment shown in FIG. 8, a sensor (see FIG. 2 at 216) is used to detect (e.g., optically) one or more edges 806 (for example, two or more orthogonal major edges) of edible decorating blank 802. Once the sensor spatially locates the edge position of edible decorating blank 802, a laser beam (see FIG. 2 at 224) cuts a new edge 808 through releasable backing 804 at a selected distance 810 from edge 806 in a gutter region 811 of releasable backing 804. For example, the sensor may locate edge 806 spatially relative to a nearest major edge 812 of releasable backing 804 and then cut new edge 808 relative to either edge 806 or edge 812 so that distance 810 is known. Other cuts 814 may also be made to master sheet 801 to cut individual sheets of confection decoration stock (see FIG. 1A at 100) from master sheet 801. For example, orthogonal cuts 814A may be made to individualize the stock sheets from master sheet 801.

In some embodiments, edible decorating blanks may be edge trimmed on a master sheet. FIG. 9 is a schematic top view of an embodiment of a cutting pattern 900 for edge trimming edible decorating blanks relative to a cut edge of a releasable backing 804. In the embodiment shown in FIG. 9, a sensor (see FIG. 2 at 216) is used to detect (e.g., optically) one or more edges 812 (for example, two or more orthogonal major edges) of releasable backing 804. After spatially locating the edge position of releasable backing 804, a laser beam (see FIG. 2 at 224) kiss cuts a new edge 902 inside of an outer perimeter edge 806 of edible decorating blank 802 at a selected distance 904 from edge 812 to separate, via edge separation channel 908, an edge region 906 from edge trimmed edible decorating sheet 908. Subsequently, in some embodiments edible decorating blanks 802 may be separated from one another by laser cutting through gutter regions 811, in a manner similar to that described above. In some embodiments, edge region 906 may be left in place, potentially permitting a subsequently printed edible print region (see FIG. 1A at 114) to extend to edge separation channel 908. In turn, the printed edible design is expected to fully extend the edge of the edible decorating sheet. Once trimmed, edge region 906 may be removed (e.g., by vacuum pick and place, by peeling, or by another means) from edible decorating sheet 908 along edge separation channel 908.

In some embodiments, one or more new edges 808, 814, 902 may act as datums used to register or align an edible decorating sheet with an ink jet or screen printer in a printing step or with a laser cutting tool in a kiss cutting step, although a reference edge may be employed to register edible decorating sheet 802 at any suitable step in an edible decoration manufacturing process as well as during end-use printing of one or more print regions by a user. While the examples described above relate generally to a sheet fed system, it will be understood that cutting techniques similar to those described above may be employed in-situ for a rolled web of releasable backing.

Figure 7A:
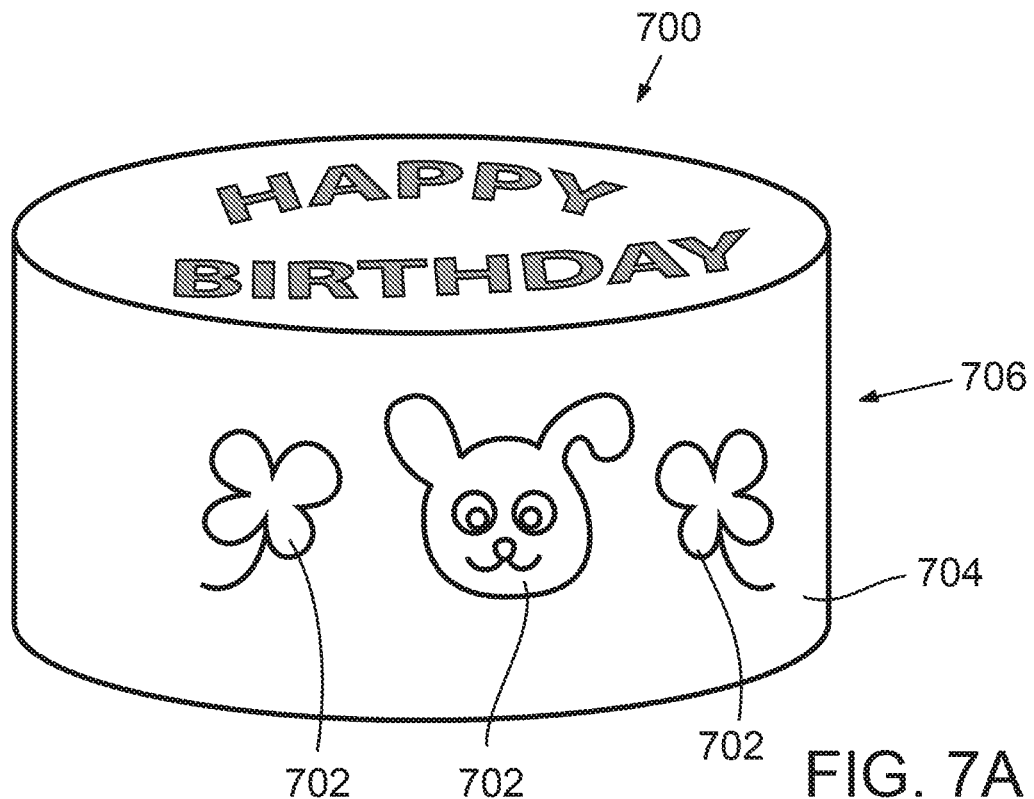
FIG. 7A is a perspective view of a cake decorated with embodiments of kiss cut edible decorations.
Figure 13:
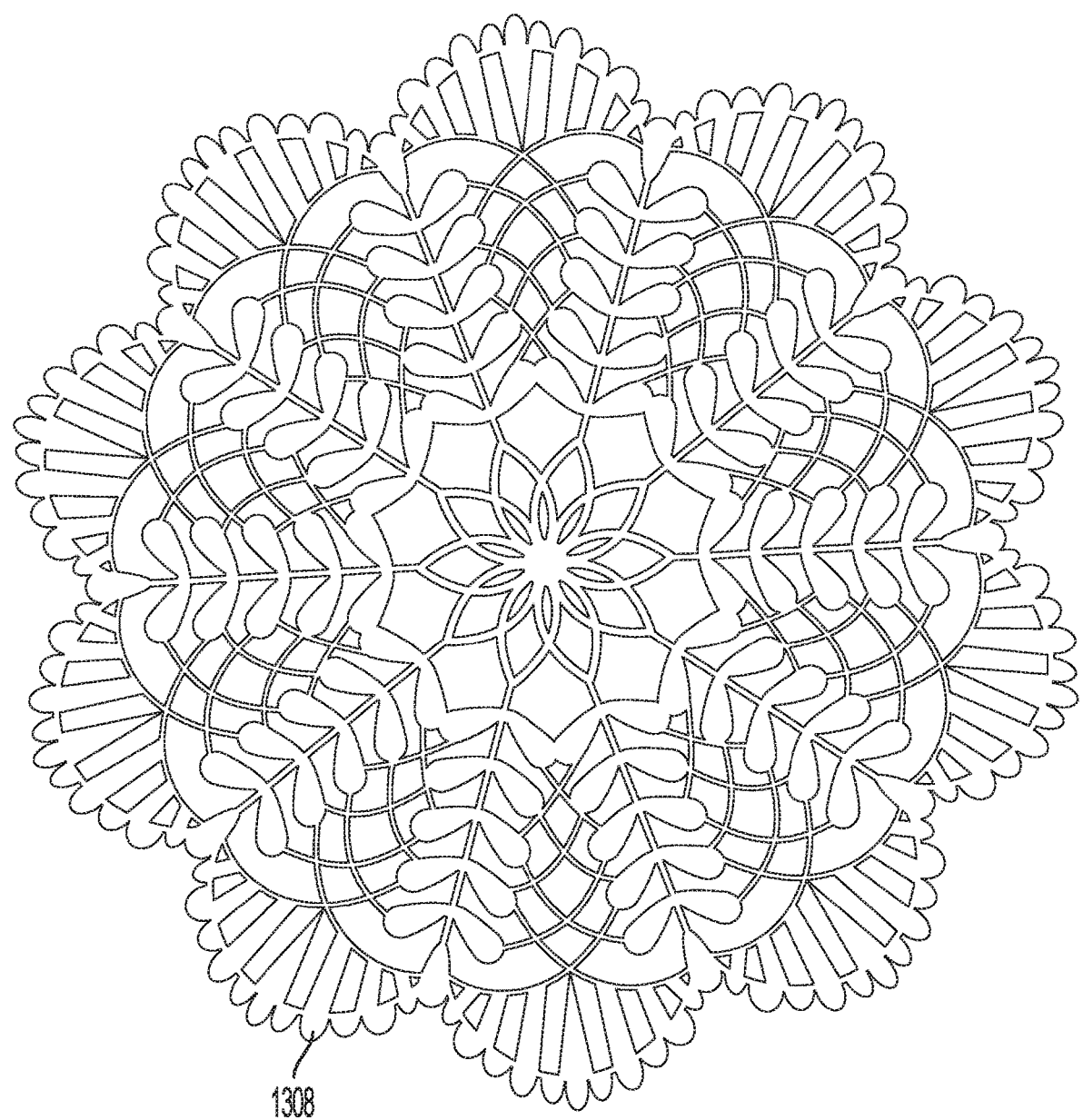
FIG. 13 is a photograph showing an embodiment of a kiss cut edible decoration.
Figure 14:
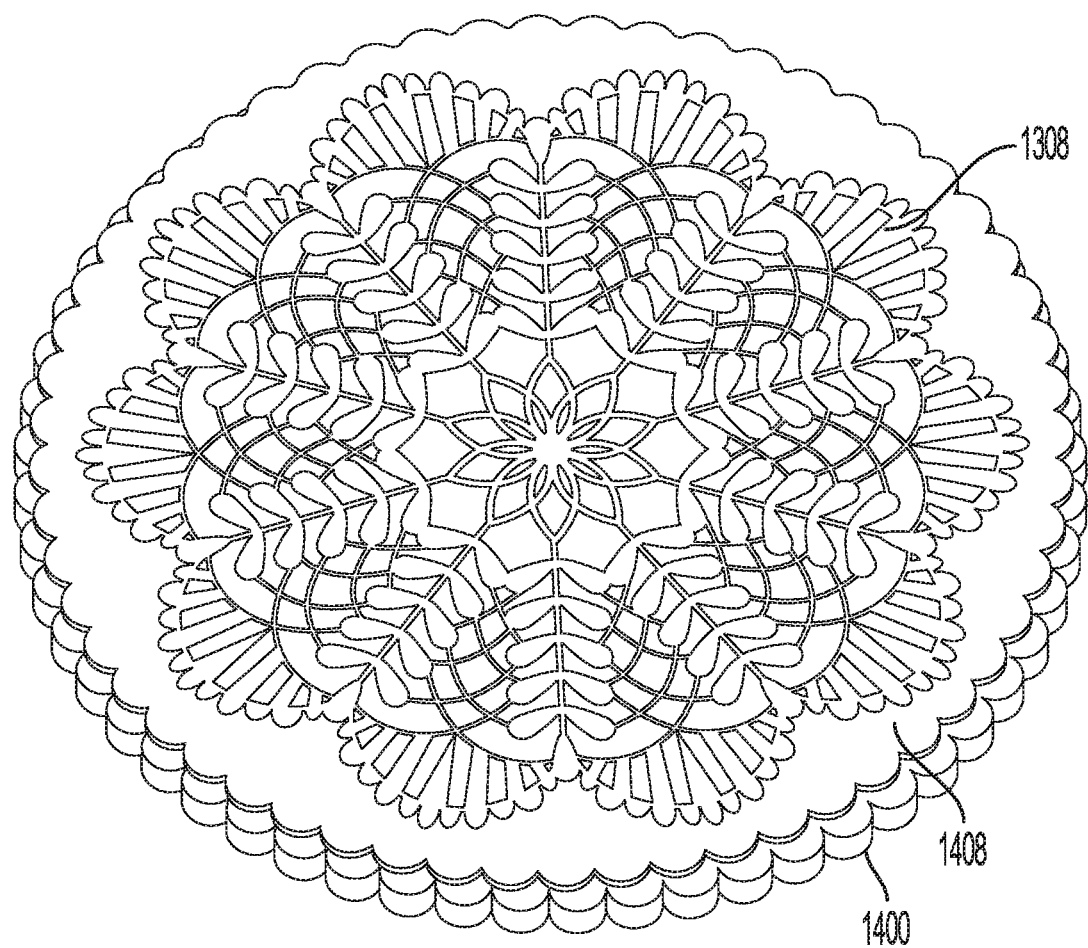
FIG. 14 is a photograph showing embodiments of kiss cut edible decorations applied to a cookie.
Figure 15:
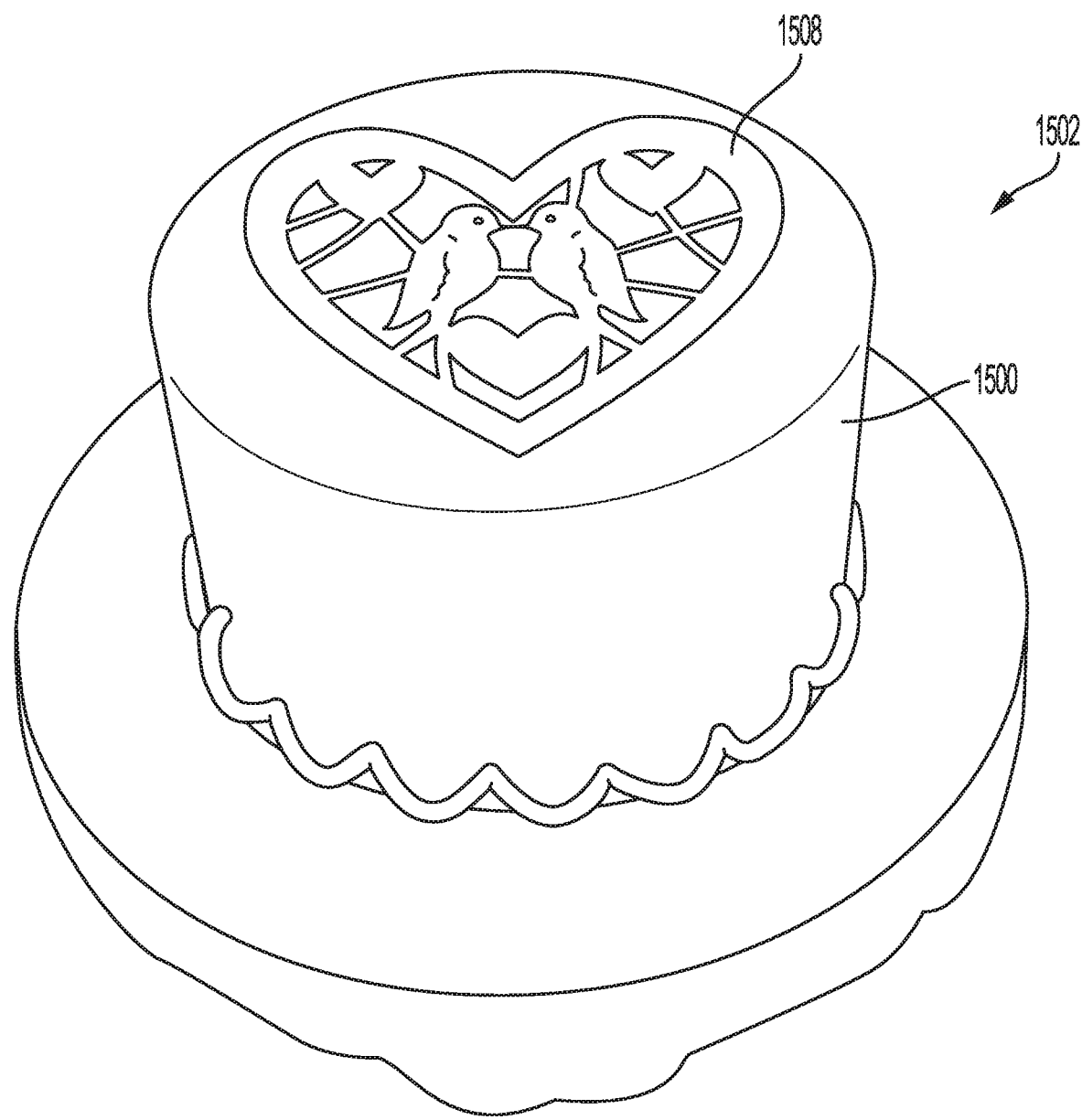
FIG. 15 is a photograph showing an embodiment of a kiss cut edible decoration applied to a cake.

FIG. 7A shows a perspective view of a cake 700 decorated with examples of kiss cut edible decorations 702 such as those manufactured according to the embodiments disclosed herein. In the embodiment shown in FIG. 7A, edible decorations 702, which have been peeled from the releasable backing and applied to cake 700, have been removably adhered to the frosting or icing forming exterior coating 704 of cake 700. As another example, FIG. 13 is a photograph showing an embodiment of a kiss cut edible decoration 1308. FIG. 14 is a photograph showing the embodiment of the kiss cut edible decoration 1308 shown in FIG. 13 applied to a another embodiment kiss cut edible decoration 1408, both of which are in place on a cookie. As yet another example, FIG. 15 is a photograph showing an embodiment of a showing an embodiment of a kiss cut edible decoration 1508 applied to an exterior coating 1500 of a cake 1502.

Preferably, the edible decorations are attached to a confection so that consumption of the confection does not loosen the decoration even though a user may still easily remove the edible decoration. In the embodiment shown in FIG. 7, edible decorations 702 may meld with exterior coating 704 (e.g., a frosting or icing layer) so that the base layer 112 (see FIG. 1A) intermingles with a portion of exterior coating 704 at a decoration-coating interface. In some embodiments, edible decorations 702 may rest on top of exterior coating 704. Regardless of how edible decoration 702 is adhered to cake 700, edible decorations 702 conform to the nonplanar surfaces 706 without cracking or delaminating therefrom in ordinary use, though edible decorations 702 may be removed from cake 700 when picked off by a user. In some examples, moisture from exterior coating 704 may soften edible decorations 702, aiding conformation and, in some instances, decoration slicing and cutting.

Figure 7B:
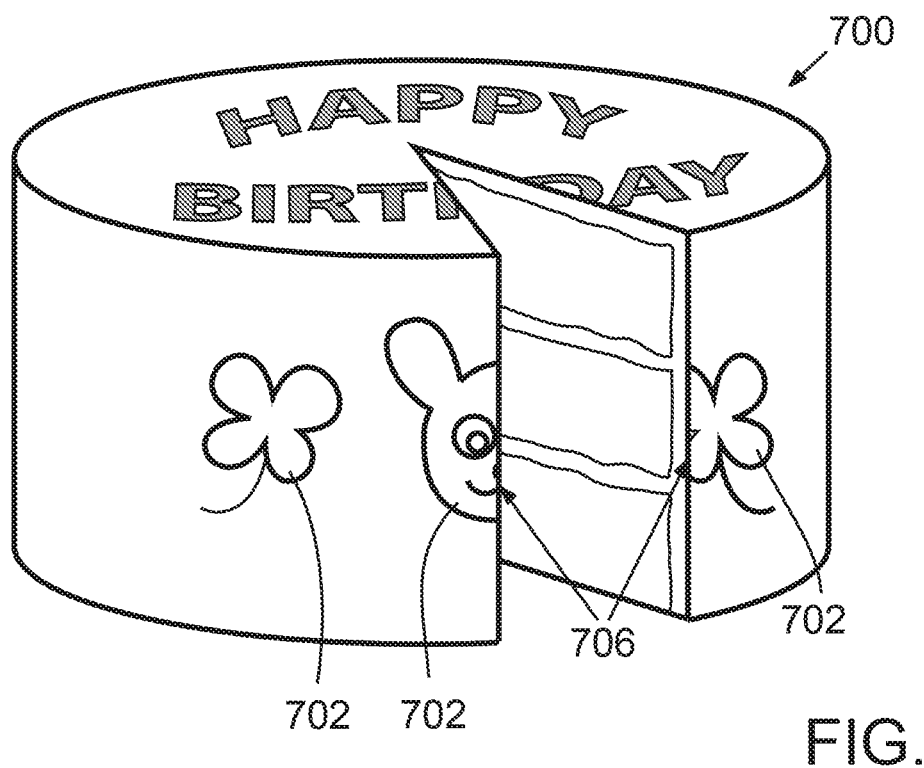
FIG. 7B is the view of FIG. 7A shown after a slice of cake has been removed with a portion of the edible decorations remaining on the cake.

FIG. 7B is the view of 7A shown after a slice of cake has been removed, including portions of edible decorations 702. Despite being sliced, edible decorations 702 maintain an attractive appearance on cake 700 because they are cuttable. That is, edible decorations 702 adhered to cake 700 are not dragged into the cake 700 by cutting knife, beyond an acceptable amount resulting from the deformation of cake 700 and the flow of exterior coating 704 under pressure from the knife. Instead, edible decorations 702 simply cleave or tear before being delaminated from cake 700.

It will be obvious to those having skill in the art that many changes may be made to the details of the above-described embodiments without departing from the underlying principles of the invention. The scope of the present invention should, therefore, be determined only by the following claims.

The invention claimed is:

1. A system for producing edible decorations from edible decorating sheets, the system comprising:
   at least one controller;

a transport system for transporting an edible decorating sheet comprising one or more layers of edible material deposited on a backing substrate; and a laser cutting tool positioned along the transport system, the laser cutting tool comprising a memory, a coordinate system, a scan head, and a laser source for generating a laser beam directed by the scan head, wherein the laser cutting tool is configured to accept the edible decorating sheet transported by the transport system within a cutting chamber of the laser cutting tool;

wherein the at least one controller is configured to create a plurality of edible decorations from the edible decorating sheet by directing the laser cutting tool to ablate channels through the one or more layers of edible material and into the backing substrate, thereby substantially separating each edible decoration from the edible decorating sheet, and ablate a respective pattern on each edible decoration of the plurality of edible decorations while controlling a depth of ablation by the laser beam to maintain the backing substrate intact beneath a path of the respective pattern, wherein, for each decoration of the plurality of edible decorations, directing the laser cutting tool to ablate the respective pattern comprises directing, via the coordinate system, the scan head to follow a respective cutting design stored to the memory of the laser cutting tool;

wherein, after creating the plurality of edible decorations, the transport system transports the plurality of edible decorations out of the cutting chamber of the laser cutting tool; and wherein each edible decoration is removable from the backing substrate by peeling the backing substrate away from the edible material.

2. The system of claim 1, wherein the one or more layers of edible material comprise a top layer deposited in a first color and a next layer deposited in a contrasting color, wherein directing the laser cutting tool to ablate the respective pattern on each edible decoration comprises controlling the depth of ablation to expose portions of the next layer.

3. The system of claim 1, wherein directing the laser cutting tool to ablate the respective pattern on each edible decoration comprises controlling the depth of ablation to cut through at least 80% of a depth of the one or more layers of edible material, wherein, after ablating the respective pattern on each edible decoration, a removable edible decoration negative surrounds each edible pattern.

4. The system of claim 1, wherein the edible decorating sheet is an edible decorating roll.

5. The system of claim 1, wherein the channels are ablated in one pass of the edible decorating sheet through the laser cutting tool and the respective patterns are ablated in another pass of the edible decorating sheet through the laser cutting tool.

6. The system of claim 1, wherein the channels are ablated interior to edges of the edible decorating sheet, thereby forming complete circuit cuts separating each edible decoration from the edible decorating sheet.

7. The system of claim 1, wherein the laser cutting tool is further configured to register spatial positions on the edible decorating sheet with the coordinate system prior to creating the plurality of edible decorations.

8. The system of claim 7, wherein the laser cutting tool comprises an optical sensor configured to determine a spatial position of at least one feature of the edible decorating sheet, wherein the spatial positions are registered using the spatial position of the at least one feature.

9. The system of claim 1, wherein a depth of the edible decorating sheet is between 100 micrometers and 1500 micrometers.

10. The system of claim 1, wherein directing the laser cutting tool to ablate the respective pattern comprises pulsing an intensity of the laser beam to form microperforations.

11. A system for producing edible decorations, the system comprising:

at least one controller;

a transport system for transporting an edible decorating sheet comprising one or more layers of edible material deposited on a backing substrate, wherein the backing substrate comprises a series of traction marks scored into a surface opposite the one or more layers of edible material for maintaining traction with the transport system; and a laser cutting tool positioned along the transport system, the laser cutting tool comprising a memory, a coordinate system, an optical sensor, a scan head, and a laser source for generating a laser beam directed by the scan head, wherein the laser cutting tool is configured to accept the edible decorating sheet transported by the transport system within a cutting chamber of the laser cutting tool;

wherein the at least one controller is configured to direct the laser cutting tool to determine, by the optical sensor, a spatial position of at least one feature of the edible decorating sheet, register spatial positions on the edible decorating sheet with the coordinate system using the spatial position of the at least one feature, and create a plurality of edible decorations from the edible decorating sheet by ablating channels through the one or more layers of edible material with the laser beam, thereby substantially separating each edible decoration from neighboring edible material on the edible decorating sheet, wherein, for each decoration of the plurality of edible decorations, ablating the channels comprises directing, via the coordinate system, the scan head to follow a respective cutting design stored to the memory of the laser cutting tool; and wherein, after creating the plurality of edible decorations, the transport system transports the plurality of edible decorations out of the cutting chamber of the laser cutting tool.

12. The system of claim 11, further comprising:

a print module for printing a design on a top surface of the edible decorating sheet, thereby creating one or more printed regions on the edible decorating sheet;

wherein creating the plurality of edible decorations comprises ablating the channels into at least one printed region of the one or more printed regions on the edible decorating sheet.

13. The system of claim 12, wherein ablating the channels comprises retaining an outer edge of the at least one printed region beyond the channels.

14. The system of claim 11, wherein the transport system continuously feeds the edible decorating sheet through the cutting chamber of the laser cutting tool.

15. The system of claim 11, wherein, after ablating the respective cutting design, a respective removable edible decoration region of the edible decorating sheet surrounds each decoration of at least a portion of the plurality of edible decorations.

16. The system of claim 15, further comprising a waste removal module for removing at least a portion of the respective removable edible decoration region from one or more decorations of the plurality of edible decorations.

17. The system of claim 11, wherein the traction marks are applied through laser scoring the backing substrate prior to providing the edible decorating sheet to the transport system.

18. A system comprising:
at least one controller; and
a plurality of production stages for producing edible decorations, the production stages comprising
a trimming stage comprising a first laser cutting tool, the first laser cutting tool configured to
accept an edible decorating sheet comprising one or more layers of edible material deposited on a backing substrate, and
an edible decoration creating stage comprising a second laser cutting tool, the edible decoration creating stage comprising
a scan head,
a laser source for generating a laser beam directed by the scan head,
a coordinate system, and
a memory; wherein
the at least one controller is configured to
1) direct the first laser cutting tool to form, from the edible decorating sheet, a plurality of edible decoration blanks, and
2) direct the second laser cutting tool to create a plurality of edible decorations from the edible decorating sheet by ablating channels through the one or more layers of edible material with the laser source of the second laser cutting tool, wherein,
for each decoration of the plurality of edible decorations, ablating the channels comprises directing, via the coordinate system of the second laser cutting tool, the scan head to follow a respective cutting design stored to the memory of the second laser cutting tool.

\* \* \* \* \*